(12) United States Patent
Aoi et al.

(10) Patent No.: US 12,353,054 B2
(45) Date of Patent: Jul. 8, 2025

(54) IMAGING APPARATUS

(71) Applicant: FUJIFILM Corporation, Tokyo (JP)

(72) Inventors: Toshihiro Aoi, Saitama (JP); Masahiko Sugimoto, Saitama (JP); Shinichi Shimotsu, Saitama (JP); Tetsuya Fujikawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 508 days.

(21) Appl. No.: 17/892,112

(22) Filed: Aug. 21, 2022

(65) Prior Publication Data

US 2022/0404579 A1    Dec. 22, 2022

Related U.S. Application Data

(63) Continuation of application No. PCT/JP2020/040101, filed on Oct. 26, 2020.

(30) Foreign Application Priority Data

Feb. 28, 2020    (JP) .................................. 2020-034195

(51) Int. Cl.
*G02B 7/28*    (2021.01)
*G02B 5/30*    (2006.01)
(Continued)

(52) U.S. Cl.
CPC ........... *G02B 7/287* (2013.01); *G02B 5/3083* (2013.01); *G02B 7/282* (2013.01); *G02B 15/14* (2013.01);
(Continued)

(58) Field of Classification Search
CPC ...... G02B 7/287; G02B 5/3083; G02B 7/282; G02B 15/14; G02B 27/1006;
(Continued)

(56) References Cited

U.S. PATENT DOCUMENTS 6,057,909 A    5/2000    Yahav et al.
6,091,905 A    7/2000    Yahav et al.
(Continued)

FOREIGN PATENT DOCUMENTS

JP    H11508371    7/1999
JP    2002318104    10/2002
(Continued)

OTHER PUBLICATIONS

International Search Report (Form PCT/ISA/210) of PCT/JP2020/040101, mailed on Dec. 8, 2020, with English translation thereof, pp. 1-5.
(Continued)

*Primary Examiner* — James C. Jones
(74) *Attorney, Agent, or Firm* — JCIPRNET

(57) ABSTRACT

An imaging apparatus includes a first optical system, a first separation optical system that separates the light transmitted through the first optical system into the first wavelength range light and the second wavelength range light, a second optical system that transmits the first wavelength range light obtained by the first separation optical system, a third optical system that transmits the second wavelength range light obtained by the first separation optical system, a first image sensor that receives the first wavelength range light, a second image sensor that receives the second wavelength range light, and a first light source that emits the first wavelength range light, in which the first optical system emits the first wavelength range light emitted from the first light source to a subject, and transmits subject light including first wavelength range reflected light obtained by reflecting the first wavelength range light by the subject.

24 Claims, 16 Drawing Sheets

(51) Int. Cl.
*G02B 15/14* (2006.01)
*G02B 27/10* (2006.01)
*G02B 27/28* (2006.01)

(52) U.S. Cl.
CPC ....... *G02B 27/1006* (2013.01); *G02B 27/281* (2013.01)

(58) Field of Classification Search
CPC ...... G02B 27/281; G02B 5/208; G03B 17/17; G03B 33/02; G03B 15/05; G03B 11/00; H04N 23/11; H04N 23/13; H04N 23/16; H04N 23/45; H04N 23/55; H04N 23/56; H04N 23/58
See application file for complete search history.

(56) References Cited

U.S. PATENT DOCUMENTS

| | | | |
|---|---|---|---|
| 6,100,517 | A | 8/2000 | Yahav et al. |
| 6,445,884 | B1 | 9/2002 | Braun et al. |
| 7,355,648 | B1 | 4/2008 | Braun et al. |
| 2001/0055482 | A1 | 12/2001 | Braun et al. |
| 2002/0097324 | A1* | 7/2002 | Onuki ................ H04N 23/6811 348/208.99 |
| 2002/0186304 | A1 | 12/2002 | Kono et al. |
| 2004/0114921 | A1 | 6/2004 | Braun et al. |
| 2022/0400240 | A1* | 12/2022 | Fujikawa ............. G02B 27/141 |

FOREIGN PATENT DOCUMENTS

| | | |
|---|---|---|
| JP | 2007134784 | 5/2007 |
| JP | 2007304124 | 11/2007 |
| JP | 2012145722 | 8/2012 |
| JP | 2016202249 | 12/2016 |

OTHER PUBLICATIONS

"Written Opinion of the International Searching Authority (Form PCT/ISA/237)" of PCT/JP2020/040101, mailed on Dec. 8, 2020, with English translation thereof, pp. 1-6.

* cited by examiner

IMAGING APPARATUS

CROSS-REFERENCE TO RELATED APPLICATIONS

This application is a continuation application of International Application No. PCT/JP2020/040101 filed Oct. 26, 2020 the disclosure of which is incorporated herein by reference in its entirety. Further, this application claims priorities from Japanese Patent Application No. 2020-034195, filed Feb. 28, 2020, the disclosure of which is incorporated herein by reference in their entirety.

TECHNICAL FIELD

The technology of the present disclosure relates to an imaging apparatus.

RELATED ART

JP1999-508371A (JP-H11-508371) discloses a device that creates an image that represents a distance to an object in a scene, the device consisting of a modulated irradiation light source that directs irradiation light to the scene such that a part of the irradiation light is reflected from the scene and reaches the device, a telecentric optical system on which the reflected irradiation light from the scene is incident, the telecentric optical system collimating the reflected irradiation light from the scene, a modulator that modulates the collimated irradiation light such that a portion of the part of the irradiation light that reaches the device depending on a distance of a different portion of the scene from the device is transmitted, a detector that detects an image formed by the modulated and collimated irradiation light, and a processor that forms an image having an intensity value distribution that represents the distance to the object from the device in accordance with an intensity distribution of the detected image.

JP2002-318104A discloses an optical imaging apparatus including an infrared light source that emits infrared light, a modulation unit that modulates the infrared light emitted from the infrared light source to emit the infrared light toward a subject, and modulates reflected infrared light from the subject, an imaging lens that receives visible light and the infrared light from the subject, a visible light/infrared light separation unit that is disposed behind the imaging lens and separates the visible light and the infrared light, a visible light image detection unit that receives the visible light from the separation unit to detect a visible light image of the subject on an imaging plane, and an infrared light image detection unit that receives the infrared light from the separation unit to detect an infrared light image of the subject on the imaging plane.

JP2012-145722A discloses a lens module including a polarizer that polarizes light from a light source, a transmitting member that reflects a part of light passing through the polarizer, guides the part of light to an object along a light-receiving axis direction of a camera that can be connected, and allows a part of reflected light from the object to pass, a birefringence optical member that separates the light reflected by the transmitting member into light beams having two polarization axis directions orthogonal to each other, and can be attached and detached, an objective lens that collects the light passing through the birefringence optical member to irradiate object, a polarization conversion member that converts a polarization state of the light passing through the objective lens, and an analyzer that polarizes the part of the reflected light from the object passing through the transmitting member, in which the polarizer and the analyzer are disposed such that the polarization axis directions are substantially parallel to each other, the birefringence optical member is disposed such that two polarization axis directions are approximately 45 degrees with respect to the polarization axis direction of the polarizer, and the polarization conversion member has a high-speed axis or a low-speed axis, and is disposed such that any axis is approximately 45 degrees with respect to the polarization axis direction of the polarizer.

SUMMARY

One embodiment according to the technology of the present disclosure provides an imaging apparatus that can image first wavelength range light and second wavelength range light included in subject light in a state in which an irradiation range of the first wavelength range light and an imaging range in which the subject light is imaged are accurately superimposed as compared with a case in which optical axis of an imaging system of the first wavelength range light and the second wavelength range light is separate from an optical axis of a projection system of the first wavelength range light.

A first aspect according to the technology of the present disclosure relates to an imaging apparatus including a first optical system that transmits light including first wavelength range light and second wavelength range light, a first separation optical system that separates the light transmitted through the first optical system into the first wavelength range light and the second wavelength range light, a second optical system that transmits the first wavelength range light obtained by separating the light by the first separation optical system, a third optical system that transmits the second wavelength range light obtained by separating the light by the first separation optical system, a first image sensor that receives the first wavelength range light emitted from the second optical system, a second image sensor that receives the second wavelength range light emitted from the third optical system, and a first light source that emits the first wavelength range light, in which the first optical system emits the first wavelength range light emitted from the first light source to a subject, and transmits subject light including first wavelength range reflected light obtained by reflecting the first wavelength range light by the subject.

A second aspect according to the technology of the present disclosure relates to the imaging apparatus according to the first aspect, in which the first optical system includes a fixed optical system that includes an optical element, which is immovable in an optical axis direction of the first optical system, and guides the subject light to the first separation optical system, and the first optical system emits the first wavelength range light emitted from the first light source to the subject by allowing the first wavelength range light to pass through at least a part of an optical path on which the first wavelength range reflected light goes toward the first image sensor through the fixed optical system.

A third aspect according to the technology of the present disclosure relates to the imaging apparatus according to the second aspect, in which the first optical system further includes a zooming optical system that is provided on a subject side with respect to the fixed optical system, and includes an optical element which is movable along the optical axis direction, and the first optical system emits the first wavelength range light emitted from the first light source to the subject by allowing the first wavelength range light to pass through at least a part of an optical path on which the first wavelength range reflected light goes toward the first image sensor through the zooming optical system and the fixed optical system.

A fourth aspect according to the technology of the present disclosure relates to the imaging apparatus according to any one of the first to third aspects, in which the first separation optical system and the first optical system emit the first wavelength range light emitted from the first light source to the subject by allowing the first wavelength range light to pass through at least a part of an optical path on which the first wavelength range reflected light goes toward the first image sensor through the first optical system and the first separation optical system.

A fifth aspect according to the technology of the present disclosure relates to the imaging apparatus according to any one of the first to fourth aspects, in which the first separation optical system transmits the first wavelength range light along a first direction along an optical axis direction of the first optical system, and reflects the second wavelength range light in a second direction intersecting the first direction.

A sixth aspect according to the technology of the present disclosure relates to the imaging apparatus according to any one of the first to fifth aspects, in which the second optical system further includes a second separation optical system, and the second separation optical system reflects the first wavelength range light emitted from the first light source, and guides the first wavelength range light to the first separation optical system by allowing the first wavelength range light to pass through a part of an optical path on which the first wavelength range reflected light goes toward the first image sensor.

A seventh aspect according to the technology of the present disclosure relates to the imaging apparatus according to any one of the first to sixth aspects, in which the first optical system includes a phase plate that polarizes the first wavelength range light, the second optical system includes a first polarizing plate that allows light in a first polarization direction to pass, the phase plate emits the first wavelength range light emitted from the first light source to the subject by transmitting the first wavelength range light, and polarizes the first wavelength range reflected light in the first polarization direction by allowing the first wavelength range reflected light to be incident, and the first polarizing plate guides the first wavelength range reflected light polarized in the first polarization direction by the phase plate to the first image sensor by allowing the first wavelength range reflected light to pass.

An eighth aspect according to the technology of the present disclosure relates to the imaging apparatus according to the seventh aspect, in which the first polarization direction is a direction orthogonal to a polarization direction of the first wavelength range light emitted from the first light source.

A ninth aspect according to the technology of the present disclosure relates to the imaging apparatus according to the seventh or eighth aspect, in which the phase plate is a ¼ phase plate, and the phase plate emits the first wavelength range light emitted from the first light source to the subject by transmitting the first wavelength range light, and changes a polarization direction of the first wavelength range light by 90 degrees with respect to a polarization direction of the first wavelength range light before the first wavelength range light is transmitted, by allowing the first wavelength range reflected light to be incident.

A tenth aspect according to the technology of the present disclosure relates to the imaging apparatus according to any one of the seventh to ninth aspects, in which the first light source is a non-polarization light source, the second optical system further includes a second polarizing plate, the second polarizing plate polarizes the first wavelength range light emitted from the first light source in a second polarization direction, and the first wavelength range light polarized in the second polarization direction passes through the phase plate to be the light in the first polarization direction.

An eleventh aspect according to the technology of the present disclosure relates to the imaging apparatus according to any one of the first to tenth aspects, further including a distance-measuring device that detects the first wavelength range reflected light to measure a distance to the subject based on a detection result.

A twelfth aspect according to the technology of the present disclosure relates to the imaging apparatus according to any one of the first to eleventh aspects, further including a first processor, in which the first processor measures a distance to the subject based on an emission timing at which the first wavelength range light is emitted from the first light source, and a light-receiving timing at which the first wavelength range reflected light is received by the first image sensor.

A thirteenth aspect according to the technology of the present disclosure relates to the imaging apparatus according to any one of the first to twelfth aspects, further including a second processor, in which the second processor generates image data for the subject light based on an emission timing at which the first wavelength range light is emitted from the first light source, and a light-receiving timing at which the first wavelength range reflected light is received by the first image sensor.

A fourteenth aspect according to the technology of the present disclosure relates to the imaging apparatus according to any one of the first to thirteenth aspects, in which the second wavelength range light is visible light, and the first wavelength range light is long-wavelength light having a longer wavelength than the visible light.

A fifteenth aspect according to the technology of the present disclosure relates to the imaging apparatus according to the fourteenth aspect, in which the long-wavelength light is light in an infrared light wavelength range having a wavelength range of 1400 nm or more and 2600 nm or less.

A sixteenth aspect according to the technology of the present disclosure relates to the imaging apparatus according to the fifteenth aspect, in which the infrared light wavelength range is a near-infrared light wavelength range including 1550 nm.

A seventeenth aspect according to the technology of the present disclosure relates to the imaging apparatus according to the fourteenth aspect, in which the long-wavelength light is light in a near-infrared light wavelength range having a wavelength range of 750 nm or more and 1000 nm or less.

An eighteenth aspect according to the technology of the present disclosure relates to the imaging apparatus according to any one of the first to seventeenth aspects, further including a first stop that is provided between the first light source and the first optical system, and limits a light amount of the first wavelength range light emitted from the first light source.

A nineteenth aspect according to the technology of the present disclosure relates to the imaging apparatus according to any one of the first to eighteenth aspects, in which the first optical system includes a plurality of lenses, and an anti-reflection film that makes reflectivity to the first wavelength range light and the second wavelength range light lower than reflectivity to light in other wavelength ranges is formed on a light-receiving surface of at least one lens of the plurality of lenses.

A twentieth aspect according to the technology of the present disclosure relates to the imaging apparatus according to any one of the first to nineteenth aspects, in which the first optical system includes a second stop having an aperture and an outer peripheral region that forms the aperture, the aperture transmits the first wavelength range light and the second wavelength range light, and the outer peripheral region transmits the first wavelength range light and limits transmission of the second wavelength range light.

A twenty-first aspect according to the technology of the present disclosure relates to the imaging apparatus according to any one of the first to twentieth aspects, in which the second optical system includes a focus adjustment optical system including a lens capable of adjusting a focus of the first wavelength range reflected light.

A twenty-second aspect according to the technology of the present disclosure relates to the imaging apparatus according to any one of the first to twenty-first aspects, further including a light distribution adjustment optical system that is provided between the first light source and an optical path through which the first wavelength range reflected light passes, and includes a lens capable of adjusting light distribution of the first wavelength range light emitted from the first light source.

A twenty-third aspect according to the technology of the present disclosure relates to the imaging apparatus according to any one of the first to twenty-second aspects, further including a beam expander optical system that is provided between the first light source and an optical path through which the first wavelength range reflected light passes, and is capable of adjusting a beam diameter of the first wavelength range light emitted from the first light source.

A twenty-fourth aspect according to the technology of the present disclosure relates to the imaging apparatus according to any one of the first to twenty-third aspects, in which the first light source has a Brewster window, and the first light source emits the first wavelength range light through the Brewster window.

A twenty-fifth aspect according to the technology of the present disclosure relates to the imaging apparatus according to any one of the first to twenty-fourth aspects, in which the first light source is a light source capable of changing an emission direction of the first wavelength range light.

DETAILED DESCRIPTION

An example of embodiments according to the technology of the present disclosure will be described with reference to the accompanying drawings.

First, the terms used in the following description will be described.

CPU refers to an abbreviation of "central processing unit". RAM refers to an abbreviation of "random access memory". ROM refers to an abbreviation of "read only memory". SSD refers to an abbreviation of "solid state drive". HDD refers to an abbreviation of "hard disk drive". EEPROM refers to an abbreviation of "electrically erasable and programmable read only memory". ASIC refers to an abbreviation of "application specific integrated circuit". PLD refers to an abbreviation of "programmable logic device". FPGA refers to an abbreviation of "field-programmable gate array". CMOS refers to an abbreviation of complementary metal oxide semiconductor. CCD refers to an abbreviation of charge-coupled device. UI refers to an abbreviation of "user interface". GPU refers to an abbreviation of "graphics processing unit". AF refers to an abbreviation of "auto focus". SWIR refers to an abbreviation of "short-wavelength infrared". LED refers to an abbreviation of "light emitting diode". TOF refers to an abbreviation of "time of flight".

In the present specification, it should be noted that the term "consist of ~" means that a lens that does not substantially have optical power, optical elements other than the lens, such as a stop, a filter, and a cover glass, and mechanism parts, such as a lens flange, a lens barrel, an imaging element, and a shake correction mechanism, and the like may be provided, in addition to the described components.

In addition, in the technical description of the present specification, the meaning of "same" includes the meaning of the perfect same as well as the meaning of the substantially same including errors tolerated in design and manufacturing. In addition, in the description of the present specification, the meaning of "orthogonal" includes the meaning of a perfect orthogonality as well as the meaning of a substantial orthogonality including errors tolerated in design and manufacturing.

First Embodiment

Figure 1:
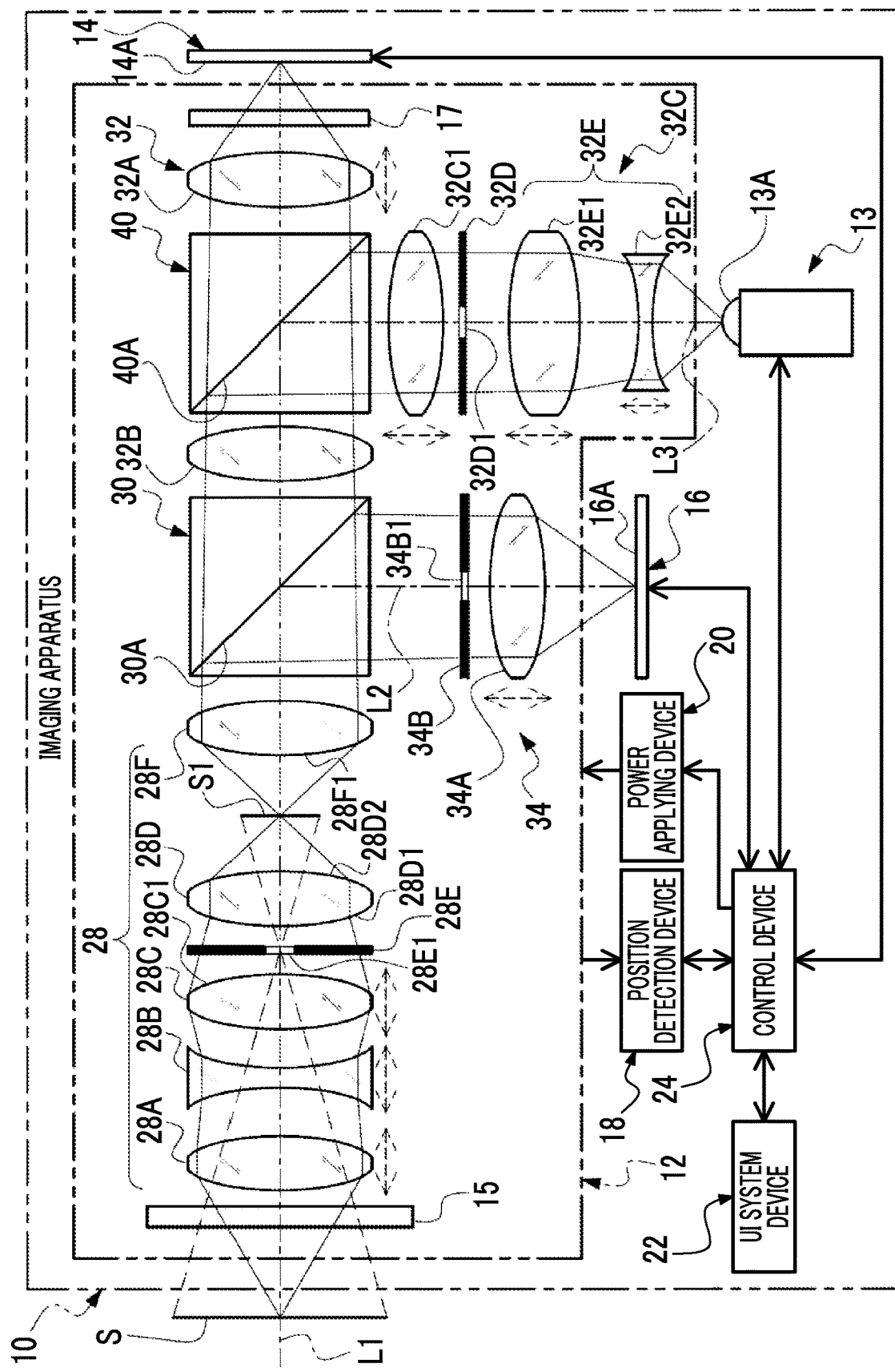
FIG. 1 is a schematic configuration diagram showing an example of a configuration of an imaging apparatus according to a first embodiment.

As shown in FIG. 1 as an example, an imaging apparatus 10 is an apparatus that images a subject S. The imaging apparatus 10 includes an optical separation device 12, a light source 13, a first image sensor 14, a second image sensor 16, a position detection device 18, a power applying device 20, a UI system device 22, and a control device 24.

The optical separation device 12 includes a first optical system 28, a first separation prism 30, a second optical system 32, and a third optical system 34.

Subject light indicating the subject S includes visible light, which is light in a visible wavelength range, and long-wavelength light having a longer wavelength than the visible light as light in different wavelength ranges. In the first image sensor 14, the subject light is separated by the optical separation device 12, and the long-wavelength light imaged on the light-receiving surface 14A is imaged. In the second image sensor 16, the subject light is separated by the optical separation device 12, and the visible light imaged on a light-receiving surface 16A is imaged. It should be noted that the long-wavelength light is an example of "first wavelength range light" according to the technology of the present disclosure, the long-wavelength light included in the subject light is an example of "first wavelength range reflected light" according to the technology of the present disclosure, and the visible light is an example of "second wavelength range light" according to the technology of the present disclosure. In addition, in the following, for convenience of description, the long-wavelength light will be described as infrared light.

The optical separation device 12 is provided with an infrared light optical path and a visible light optical path. In the infrared light optical path, the first optical system 28, the first separation prism 30, and the second optical system 32 are disposed in order from a subject side (object side) along an optical axis L1. The first optical system 28 transmits the infrared light and the visible light included in the subject light. The first separation prism 30 separates the subject light into the infrared light and the visible light, and guides the infrared light and the visible light to the second optical system 32 and the third optical system 34, respectively. The first image sensor 14 is disposed on a subsequent stage of the second optical system 32. That is, the first image sensor 14 is positioned on an image side with respect to the second optical system 32, and receives the infrared light emitted from the second optical system 32.

The first image sensor 14 is an infrared light two-dimensional image sensor and images the infrared light. The first image sensor 14 includes the light-receiving surface 14A. The light-receiving surface 14A is formed by a plurality of photosensitive pixels (not shown) disposed in a matrix, each photosensitive pixel is exposed, and the photoelectric conversion is performed for each photosensitive pixel. In the first image sensor 14, a plurality of photoelectric conversion elements having sensitivity to the infrared light are adopted as the plurality of photosensitive pixels. In the first image sensor 14, the photoelectric conversion element includes an InGaAs photodiode in which an infrared light transmission filter is disposed and a CMOS read-out circuit. Here, although the InGaAs photodiode has been described, the technology of the present disclosure is not limited to this, and a simulation of type-II quantum well (T2SL) photodiode may be applied instead of the InGaAs photodiode. It should be noted that the first image sensor 14 is an example of a "first image sensor" according to the technology of the present disclosure.

The visible light optical path includes the optical axis L1 and an optical axis L2. The optical axis L2 is an optical axis intersecting the optical axis L1. In the visible light optical path, the first optical system 28 and the first separation prism 30 are disposed in order from the subject side along the optical axis L1. The optical axis L1 is branched into the optical axis L2 by the first separation prism 30. In the visible light optical path, the third optical system 34 is disposed along the optical axis L2 on the image side of the first separation prism 30. The second image sensor 16 is disposed on a subsequent stage of the third optical system 34, that is, on the image side with respect to the third optical system 34. Stated another way, the third optical system 34 is provided between the first separation prism 30 and the second image sensor 16. The second image sensor 16 receives the visible light emitted from the third optical system 34.

The second image sensor 16 is a visible light two-dimensional image sensor and images the visible light. The second image sensor 16 includes the light-receiving surface 16A. The light-receiving surface 16A is formed by a plurality of photosensitive pixels (not shown) disposed in a matrix, each photosensitive pixel is exposed, and the photoelectric conversion is performed for each photosensitive pixel. In the second image sensor 16, a plurality of photoelectric conversion elements having sensitivity to the visible light are adopted as the plurality of photosensitive pixels. In the second image sensor 16, the photoelectric conversion element includes a S1 photodiode in which a color filter is disposed and a CMOS read-out circuit. The color filter is a filter corresponding to red (R), a filter corresponding to green (G), and a filter corresponding to blue (B), which are disposed on the light-receiving surface 16A in a specific arrangement pattern. Here, an X-Trans (registered trademark) arrangement is adopted as the specific arrangement pattern. The arrangement pattern is not limited to this, and may be other types of arrangement pattern, such as a bayer arrangement or a honeycomb arrangement. It should be noted that the second image sensor 16 is an example of a "second image sensor" according to the technology of the present disclosure.

The first optical system 28 transmits the infrared light emitted from the light source 13 and emits the infrared light to the subject S. In addition, the subject light is incident on the first optical system 28 from a first lens group 28A, and the first optical system 28 guides the incident subject light to the first separation prism 30. That is, the first optical system 28 transmits the subject light including the infrared light obtained by reflecting the infrared light emitted from the light source 13 by the subject, and guides the subject light to the first separation prism 30.

The first optical system 28 includes a first lens group 28A, a second lens group 28B, a third lens group 28C, and a fourth lens group 28D in order from the subject S side. The first lens group 28A is a lens group having positive optical power, the second lens group 28B is a lens group having negative optical power, the third lens group 28C is a lens group having positive optical power, and the fourth lens group 28D is a lens group having positive optical power. The first optical system 28 includes the first lens group 28A as a focus lens. In addition, the first optical system 28 includes the second lens group 28B and the third lens group 28C as the zoom lenses. It should be noted that the second lens group 28B and the third lens group 28C are examples of the "zooming optical system" according to the technology of the present disclosure. Each of the first lens group 28A, the second lens group 28B, the third lens group 28C, the fourth lens group 28D, and the fifth lens group 28F consists of a plurality of lenses.

In the first optical system 28, the first lens group 28A, the second lens group 28B, the third lens group 28C, the fourth lens group 28D, and the fifth lens group 28F are disposed in order from the subject side along the optical axis L1. The third lens group 28C includes an emission surface 28C1, and the fourth lens group 28D includes an incident surface 28D1 and an emission surface 28D2. The emission surface 28C1 is a surface of the third lens group 28C positioned closest to the image side, the incident surface 28D1 is a surface of the fourth lens group 28D positioned closest to the subject side, and the emission surface 28D2 is a surface of the fourth lens group 28D positioned closest to the image side. The stop 28E is disposed between the emission surface 28C1 and the incident surface 28D1. In the example shown in FIG. 1, the stop 28E is disposed at a position adjacent to the fourth lens group 28D (for example, between the emission surface 28C1 and the incident surface 28D1) on the subject side with respect to the fourth lens group 28D in a direction of the optical axis L1. It should be noted that this is merely an example, and the stop 28E may be disposed in the fourth lens group 28D.

Both the first lens group 28A and the fourth lens group 28D are stationary lens groups. The stationary lens group is a lens group fixed to an image plane during changing magnification. Both the second lens group 28B and the third lens group 28C are movable lens groups. The movable lens group is a lens group in which an interval from an adjacent lens group is changed by moving along the direction of the optical axis L1 during changing magnification. Each of the first lens group 28A, the third lens group 28C, the fourth lens group 28D, and the fifth lens group 28F is a lens group that has positive power, and the second lens group 28B is a lens group that has negative power. It should be noted that, here, the lens groups, such as the first lens group 28A, the second lens group 28B, the third lens group 28C, the fourth lens group 28D, and the fifth lens group 28F have been described, but the technology of the present disclosure is not limited to this. For example, at least one of the first lens group 28A, the second lens group 28B, the third lens group 28C, the fourth lens group 28D, or the fifth lens group 28F may be one lens.

In the imaging apparatus 10, adjustment of a focus position is realized by the first optical system 28. The adjustment of the focus position is realized by, for example, a front lens element focus method. In the front lens element focus method, the first lens group 28A is moved along the direction of the optical axis L1, so that the infrared light is imaged on the light-receiving surface 14A at the focus position in accordance with the subject distance. The "focus position" used herein refers to a position of the first lens group 28A on the optical axis L1 in a focused state.

It should be noted that, in the first embodiment, the front lens element focus method is adopted, but the technology of the present disclosure is not limited to this, and a whole group feeding method, an inner focus method, or a rear focus method may be adopted. The "focus position" in a case of the whole group feeding method, the inner focus method, or the rear focus method refers to a position in a focused state among the positions on the optical axis L1 of the lens or the lens group that is moved along the direction of the optical axis L1 to adjust the focus position.

The stop 28E includes an aperture 28E1, and the subject light passes through the aperture 28E1. The aperture 28E1 is disposed at a position at which peripheral rays of the subject light pass through the optical axis L1. The stop 28E is a movable stop in which a diameter of the aperture 28E1 can be changed. That is, a light amount of the subject light indicating the subject S can be changed by the stop 28E. The details of the stop 28E will be described below. The stop 28E is an example of a "second stop" according to the technology of the present disclosure.

The first optical system 28 forms an intermediate image S1 on the optical axis L1. Specifically, the intermediate image S1 is formed between the stop 28E and the first separation prism 30 by the first optical system 28. More specifically, the intermediate image S1 is formed by the first optical system 28 between the emission surface 28D2, which is the surface of the fourth lens group 28D closest to the image side, and an incident surface 28F1, which is the surface of the fifth lens group 28F closest to the subject side. The fifth lens group 28F is disposed between the intermediate image S1 and the first separation prism 30 on the optical axis L1. Since the fifth lens group 28F has positive power, the luminous flux of the subject light is incident on the first separation prism 30 by giving a converging action to the subject light incident on the fifth lens group 28F as divergent light. That is, the fifth lens group 28F accommodates the peripheral rays of the incident subject light in the first separation prism 30 by positive optical power.

In addition, the fifth lens group 28F is a stationary lens group that is immovable in the direction of the optical axis L1. Further, the fifth lens group 28F guides the subject light transmitted through the first optical system 28 to the first separation prism 30. It should be noted that the fifth lens group 28F is an example of a "fixed optical system" according to the technology of the present disclosure.

Here, as described above, the first optical system 28 also functions as the optical system that transmits the infrared light emitted from the light source 13 and emits the infrared light to the subject S, in addition to functioning as the optical system on which the subject light is incident. As an example, as shown in FIG. 1, the first optical system 28 emits the infrared light emitted from the light source 13 to the subject S by allowing the infrared light to pass through an optical path on which the subject light goes toward the first image sensor 14 through the fifth lens group 28F which is the stationary lens group in the first optical system 28.

Specifically, the first optical system 28 emits the infrared light emitted from the light source 13 to the subject S by allowing the infrared light to pass through an optical path on which the subject light goes toward the first image sensor 14 through the first lens group 28A, the second lens group 28B, the third lens group 28C, the fourth lens group 28D, and the fifth lens group 28F.

In addition, the first separation prism 30 and the first optical system 28 emit the infrared light emitted from the light source 13 to the subject S by allowing the infrared light to pass through a part of an optical path on which the subject light goes toward the first image sensor 14 through the first optical system 28 and the first separation prism 30. As described above, the first optical system 28 emits the infrared light emitted from the light source 13 to the subject S by using a part of the optical path on which the subject light goes toward the first image sensor 14. That is, in the imaging apparatus 10, the optical system that images the infrared light and the visible light and the optical system that emits the infrared light from the light source 13 are coaxial in a part of the optical path of the first optical system 28.

In addition, the first optical system 28 includes a phase plate 15. As shown in FIG. 1 as an example, the phase plate 15 is provided on the subject S side of the first lens group 28A in the first optical system 28. The phase plate 15 changes a phase of the infrared light emitted from the light source 13 to convert a polarization direction. That is, the phase plate 15 polarizes the infrared light. Specifically, the phase plate 15 emits the infrared light emitted from the light source 13 to the subject S by transmitting the infrared light, and polarizes the infrared light by reflecting the infrared light by the subject S to be incident on the phase plate 15. As an example, the polarization direction of the infrared light after the polarization by the phase plate 15 is a direction intersecting the polarization direction of the infrared light emitted from the light source 13. Examples of the intersecting direction include an orthogonal direction. It should be noted that the phase plate 15 is an example of a "phase plate" according to the technology of the present disclosure.

As an example, the phase plate 15 is a ¼ phase plate. The ¼ phase plate as the phase plate 15 emits the infrared light emitted from the light source 13 to the subject S by transmitting the infrared light, and changes the polarization direction of the infrared light by 90 degrees with respect to the polarization direction of the infrared light before being transmitted through the phase plate 15 by allowing the infrared light reflected by the subject S to be incident on the phase plate 15.

In addition, the first optical system 28 emits the incident subject light to the first separation prism 30.

The first separation prism 30 is an example of a "first separation optical system" according to the technology of the present disclosure. The first separation prism 30 separates the subject light transmitted through the first optical system 28 into near-infrared light and the visible light by a selective reflecting surface 30A. The first separation prism 30 transmits the infrared light and reflects the visible light. That is, the first separation prism 30 guides the infrared light to the second optical system 32 along the optical axis L1 and guides the visible light to the third optical system 34 along the optical axis L2.

The infrared light obtained by separating the subject light by the first separation prism 30 is, as an example, long-wavelength light having a longer wavelength than the visible light in the subject light, and, light having an infrared light wavelength range of 1400 nanometers (nm) or more and 2600 nm or less is adopted here. In addition, the visible light is light having a short wavelength of 700 nanometers or less. The infrared light in the subject light is transmitted through the first separation prism 30 with transmittance of about 90 percent (%), and the visible light in the subject light is reflected by the selective reflecting surface 30A with reflectivity exceeding about 90%.

In addition, here, although the first separation prism 30 has been described, the technology of the present disclosure is not limited to this, and the subject light may be separated into the infrared light and the visible light by a dichroic mirror and/or a half mirror instead of the first separation prism 30. It should be noted that, in a case in which the half mirror is used, the light having an unneeded wavelength range may be removed, by a filter, from the infrared light and the visible light obtained by separating the subject light.

The infrared light separated from the subject light by the first separation prism 30 is transmitted through the second optical system 32. The second optical system 32 is disposed on the image side with respect to the first separation prism 30 along the direction of the optical axis L1. Stated another way, the second optical system 32 is disposed on a side on which the infrared light is emitted from the first separation prism 30. The second optical system 32 includes a relay lens 32A. The relay lens 32A is a lens that has positive power. The infrared light emitted from the first separation prism 30 is incident on the relay lens 32A, and the relay lens 32A images the incident infrared light on the light-receiving surface 14A.

In addition, the second optical system 32 includes a focus adjustment lens group 32B and a second separation prism 40 in order from the subject side on the optical axis L1. The focus adjustment lens group 32B is provided between the first separation prism 30 and the second separation prism 40, and is moved along the optical axis L1 to adjust a focus of the infrared light imaged on the light-receiving surface 14A of the first image sensor 14. It should be noted that the focus adjustment lens group 32B is an example of a "focus adjustment optical system" according to the technology of the present disclosure.

The second separation prism 40 is provided on a subsequent stage of the focus adjustment lens group 32B. That is, the second separation prism 40 is provided on the image side with respect to the focus adjustment lens group 32B. The second separation prism 40 is an example of a "second separation optical system" according to the technology of the present disclosure. The second separation prism 40 transmits the infrared light included in the subject light and guides the infrared light to the relay lens 32A. In addition, the second separation prism 40 reflects the infrared light emitted from the light source 13 along an optical axis L3 by a selective reflecting surface 40A, and guides the infrared light to the first optical system 28 along the optical axis L1. Stated another way, the second separation prism 40 reflects the infrared light emitted from the light source 13 and allows the infrared light included in the subject light to pass through a part of the optical path toward the first image sensor 14 to guide the infrared light to the first separation prism 30.

The second optical system 32 includes a polarizing plate 17. As shown in FIG. 1 as an example, the polarizing plate 17 is provided between the relay lens 32A and the first image sensor 14 on the optical axis L1. The polarizing plate 17 transmits the infrared light in a predetermined polarization direction among the infrared light beams emitted from the relay lens 32A. Specifically, the polarizing plate 17 allows only the infrared light in the polarization direction after being polarized by the phase plate 15 to pass. Moreover, the polarizing plate 17 guides the infrared light in the predetermined polarization direction to the first image sensor 14 among the infrared light beams included in the subject light.

It should be noted that the polarizing plate 17 is an example of a "first polarizing plate" according to the technology of the present disclosure.

In addition, the second optical system 32 includes a light source optical system 32C that transmits the first wavelength range light emitted from the light source 13. The light source optical system 32C is provided on the optical axis L3 between the second separation prism 40 and the light source 13, and includes a light distribution adjustment lens group 32C1, a light source stop 32D, and a beam expander optical system 32E in order from the subject side. The light distribution adjustment lens group 32C1 adjusts light distribution and/or a light distribution angle of the infrared light emitted from the light source 13 by moving along the optical axis L3. The light distribution adjustment lens group 32C1 is provided between the light source 13 and the optical axis L1 on the optical axis L3. The light distribution adjustment lens group 32C1 is an example of a "light distribution adjustment optical system" according to the technology of the present disclosure.

The light source stop 32D is provided between the light source 13 and the first optical system 28 on the optical axis L3, and limits a light amount of the infrared light emitted from the light source 13 along the optical axis L3. Specifically, the light source stop 32D is provided between the light source 13 and the second separation prism 40 on the optical axis L3. Therefore, the light amount of the infrared light emitted from the light source 13 along the optical axis L3 is limited by the light source stop 32D between the light source 13 and the second separation prism 40.

The light source stop 32D includes an aperture 32D1, and is a movable stop in which a diameter of the aperture 32D1 can be changed. That is, the light amount of the infrared light emitted from the light source 13 can be changed by the light source stop 32D. It should be noted that the light source stop 32D is an example of a "first stop" according to the technology of the present disclosure.

The beam expander optical system 32E is an optical system capable of changing a beam diameter of the infrared light emitted from the light source 13. The beam expander optical system 32E is provided between the light source 13 and the optical axis L1, on the optical axis L3. As an example, the beam expander optical system 32E includes a sixth lens group 32E1 which is a lens group having positive power and a seventh lens group 32E2 which is a lens group having negative power. The beam expander optical system 32E can change the beam diameter by changing the positions of the sixth lens group 32E1 and the seventh lens group 32E2. It should be noted that the beam expander optical system 32E is an example of a "beam expander optical system" according to the technology of the present disclosure.

The light source 13 is a light source that can emit the infrared light. The light source 13 is, as an example, a polarized light source that can emit the infrared light polarized in the predetermined polarization direction. Examples of the predetermined polarization direction include a polarization direction that is the same as the polarization direction of the polarizing plate 17 after passing through the phase plate 15. Here, a laser light source is adopted as an example of the polarized light source. In addition, the light source 13 includes a Brewster window 13A, and can emit the infrared light through the Brewster window 13A. The Brewster window 13A is an example of a "Brewster window" according to the technology of the present disclosure.

The visible light separated from the subject light by the first separation prism 30 is incident on the third optical system 34. The third optical system 34 transmits the separated visible light and guides the separated visible light to the second image sensor 16. The third optical system 34 is disposed on the image side with respect to the first separation prism 30 along a direction of the optical axis L2, and includes the relay lens 34A and the stop 34B. In the third optical system 34, the stop 34B and the relay lens 34A are disposed in order from the subject side along the optical axis L2. That is, the stop 34B is disposed at a position adjacent to the relay lens 34A on the subject side with respect to the relay lens 34A in the direction of the optical axis L2.

The stop 34B has an aperture 34B1 on the optical axis L2. The aperture 34B1 is in a conjugate positional relationship with the aperture 28E1 on the optical axis L1. The stop 34B is a movable stop in which a diameter of the aperture 34B1 can be changed. That is, a light amount of the visible light can be changed by the stop 34B. It should be noted that each of the stop 28E and the stop 34B is an independently controllable stop.

The relay lens 34A is a lens that has positive power. The relay lens 34A images the incident visible light on the light-receiving surface 16A through the stop 34B. As described above, the visible light is incident on the third optical system 34 through the stop 34B, and the third optical system 34 emits the incident visible light to the light-receiving surface 16A.

The position detection device 18 and the power applying device 20 are connected to the optical separation device 12. The position detection device 18 is a device that detects a position of the lens group, the relay lens, or the like constituting the optical separation device 12, a diameter of the aperture of the stop, or the like. The power applying device 20 is a device that applies the power to the lens group, the relay lens, or the stop constituting the optical separation device 12.

The UI system device 22 is a device that receives an instruction from a user of the imaging apparatus 10 (hereinafter, simply referred to as a "user") and presents various pieces of information to the user. Examples of the device that receives the instruction from the user include a touch panel and a hard key. Examples of the device that presents various pieces of information to the user include a display and a speaker. The first image sensor 14, the second image sensor 16, the position detection device 18, the power applying device 20, and the UI system device 22 are connected to the control device 24. The first image sensor 14, the second image sensor 16, the position detection device 18, the power applying device 20, and the UI system device 22 are controlled by the control device 24.

Figure 2:
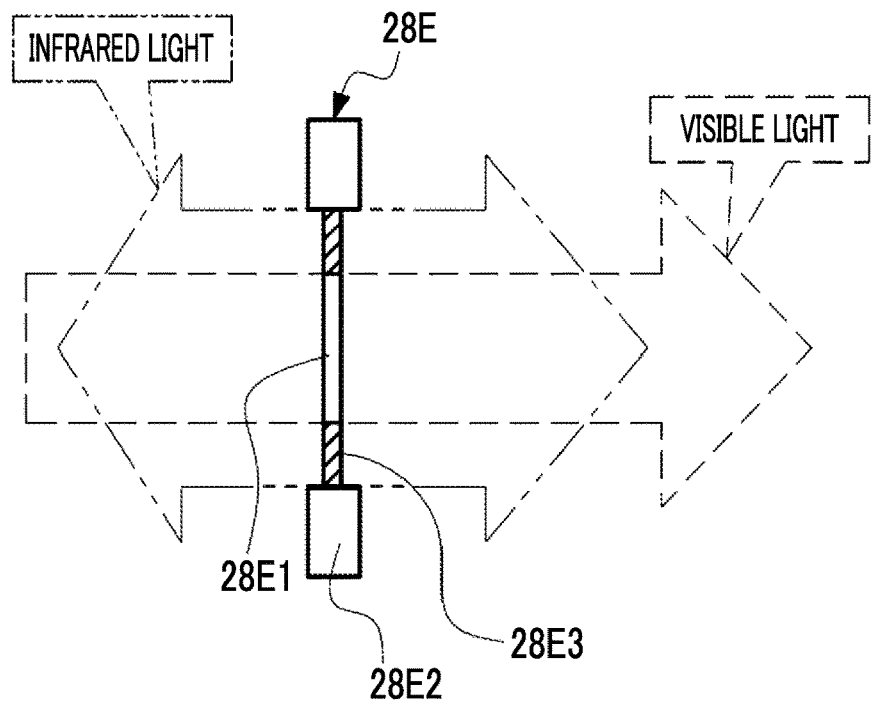
FIG. 2 is a conceptual diagram showing a configuration example of a stop provided in the imaging apparatus according to the first embodiment.

As an example, as shown in FIG. 2, the stop 28E includes a body part 28E2 and a stop leaf blade 28E3 attached to the body part 28E2. A size (aperture diameter) of the aperture 28E1 is changed as the stop leaf blade 28E3 is moved relative to the body part 28E2. That is, the aperture 28E1 is formed by the stop leaf blade 28E3.

Figure 3:
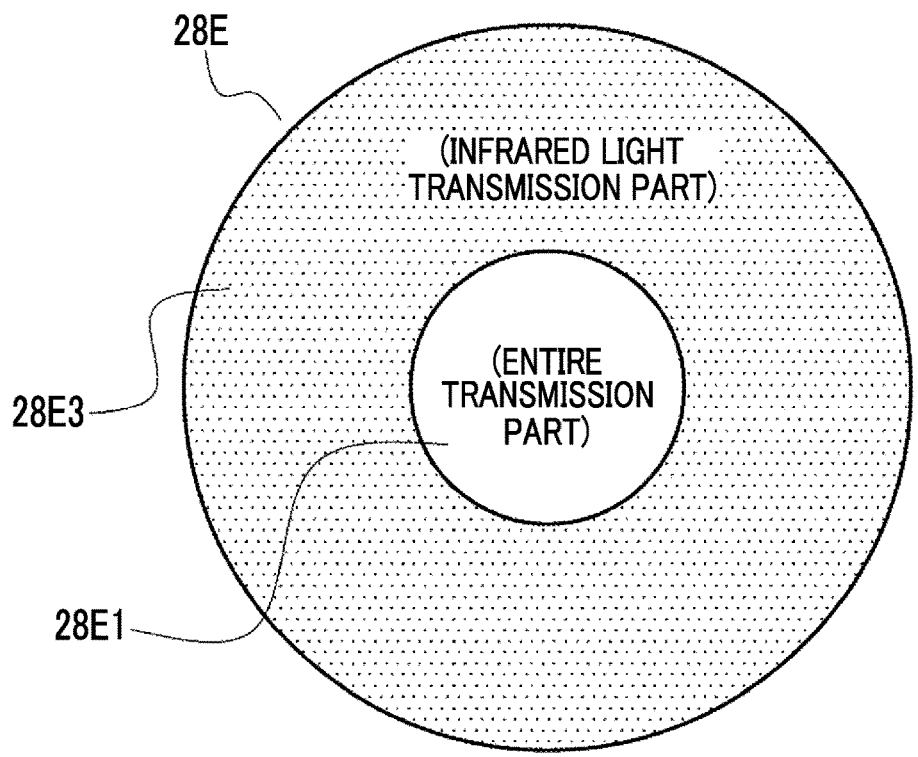
FIG. 3 is a conceptual diagram showing a configuration example of the stop provided in the imaging apparatus according to the first embodiment.

The aperture 28E1 formed in the stop 28E allows both the infrared light and the visible light to pass. That is, the aperture 28E1 allows both the subject light and the infrared light emitted from the light source 13 to pass. The stop leaf blade 28E3 transmits only the infrared light and limits the transmission of the visible light. That is, the stop leaf blade 28E3 transmits the infrared light included in the subject light and the infrared light emitted from the light source 13 to limit the transmission of the visible light. Specifically, the stop leaf blade 28E3 is made of a material having higher transmittance to the infrared light than transmittance to the visible light. As a result, as shown in FIG. 3 as an example, the aperture 28E1 formed by the stop leaf blade 28E3 is an entire transmission part that transmits the visible light and the infrared light, and an outer peripheral region at which the stop leaf blade 28E3 is present is an infrared light transmission part that transmits only the infrared light.

Figure 4:
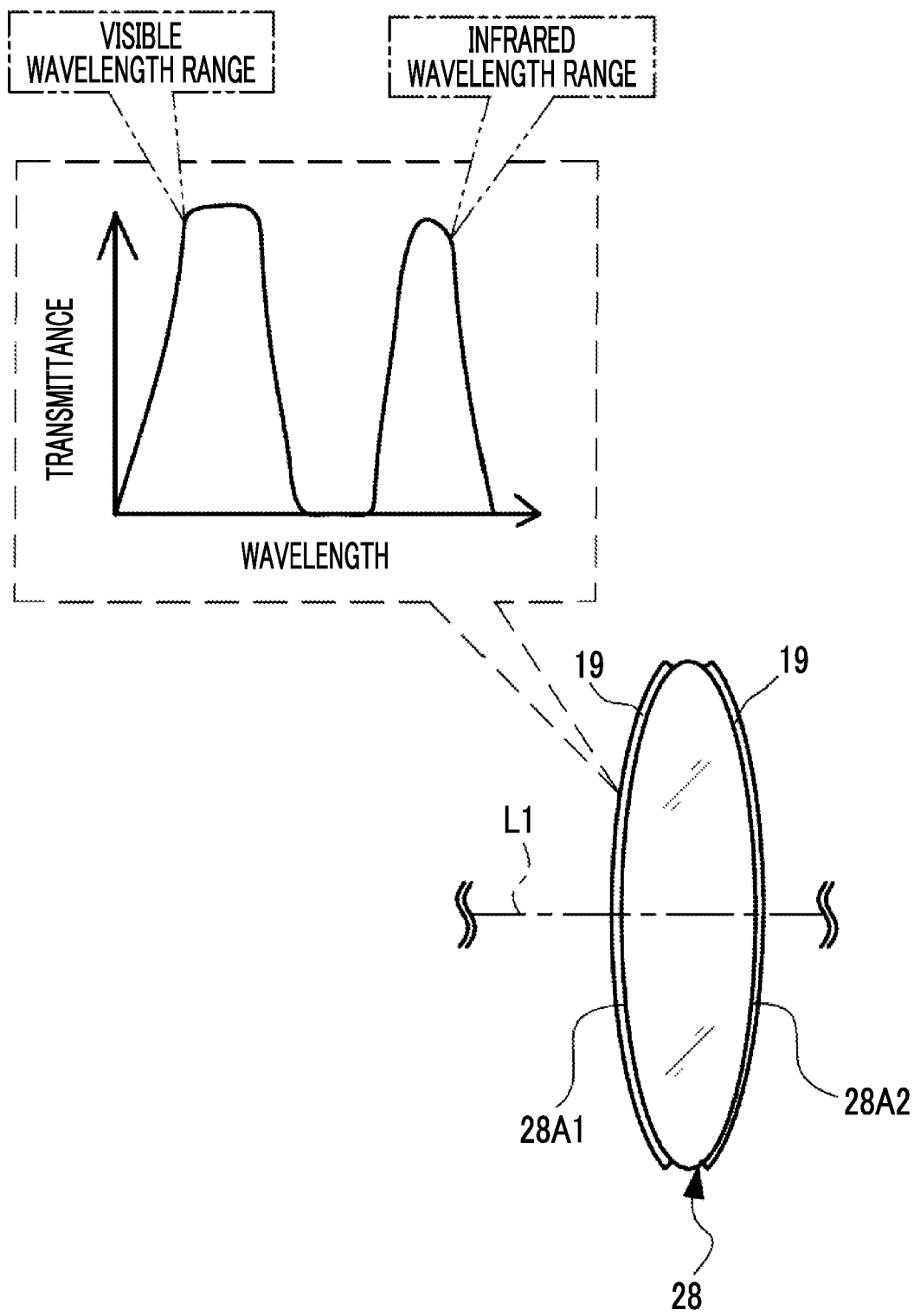
FIG. 4 is a side view showing an example of an antireflection film provided in a lens group provided in the imaging apparatus according to the first embodiment.

As an example, as shown in FIG. 4, an anti-reflection film 19 is formed on the lens group constituting the first optical system 28. For example, the anti-reflection film 19 is formed on a light-receiving surface 28A1 and an emission surface 28A2 of the first lens group 28A. It should be noted that, here, the form example is described in which the anti-reflection film 19 is formed in the first lens group 28A, but the technology of the present disclosure is not limited to this. For example, the anti-reflection film 19 may be formed in the second lens group 28B, the third lens group 28C, the fourth lens group 28D, and/or the fifth lens group 28F, instead of the first lens group 28A or together with the first lens group 28A.

The anti-reflection film 19 makes the reflectivity of the infrared light and the visible light to light in the wavelength range lower than the reflectivity of light in other wavelength ranges. Stated another way, as shown in FIG. 4 as an example, the transmittance of the infrared light and the visible light to the anti-reflection film 19 is set to be higher than that of other wavelength ranges. It should be noted that the anti-reflection film 19 is an example of an "anti-reflection film" according to the technology of the present disclosure.

Figure 5:
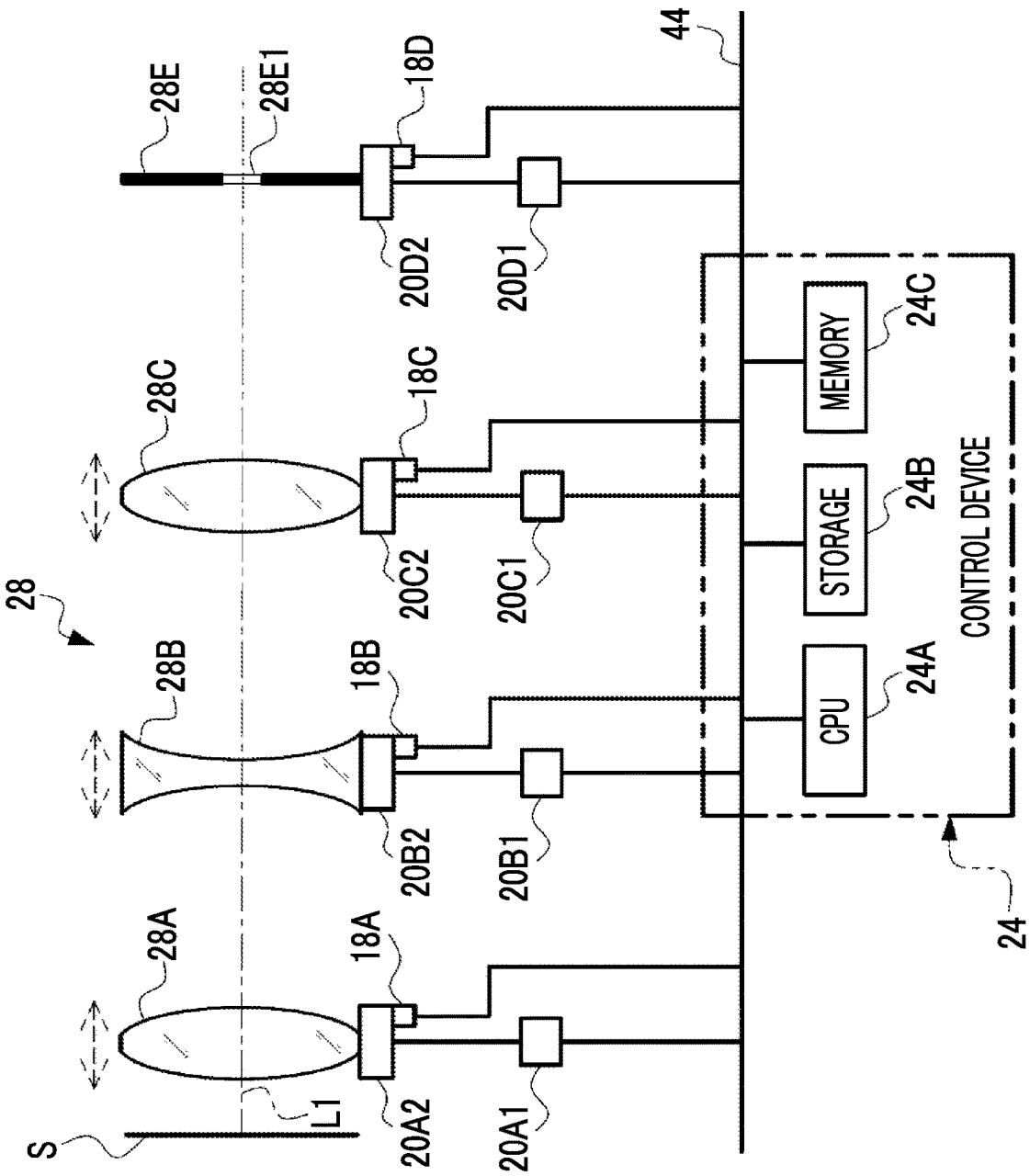
FIG. 5 is a schematic configuration diagram showing an example of hardware configurations of a first optical system provided in the imaging apparatus according to the first embodiment, and an electric system related to the first optical system.
Figure 6:
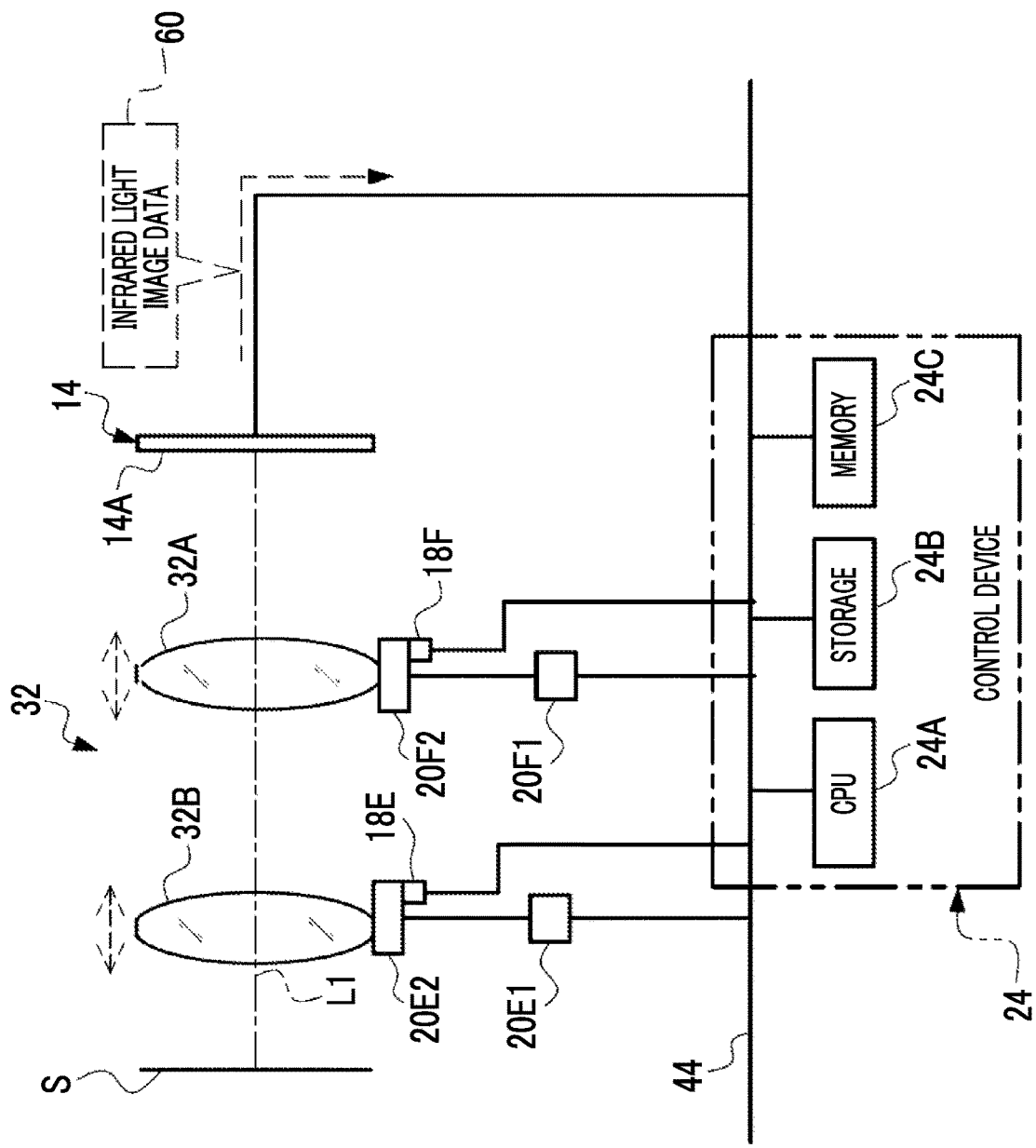
FIG. 6 is a schematic configuration diagram showing an example of hardware configurations of a second optical system provided in the imaging apparatus according to the first embodiment, and an electric system related to the second optical system.
Figure 7:
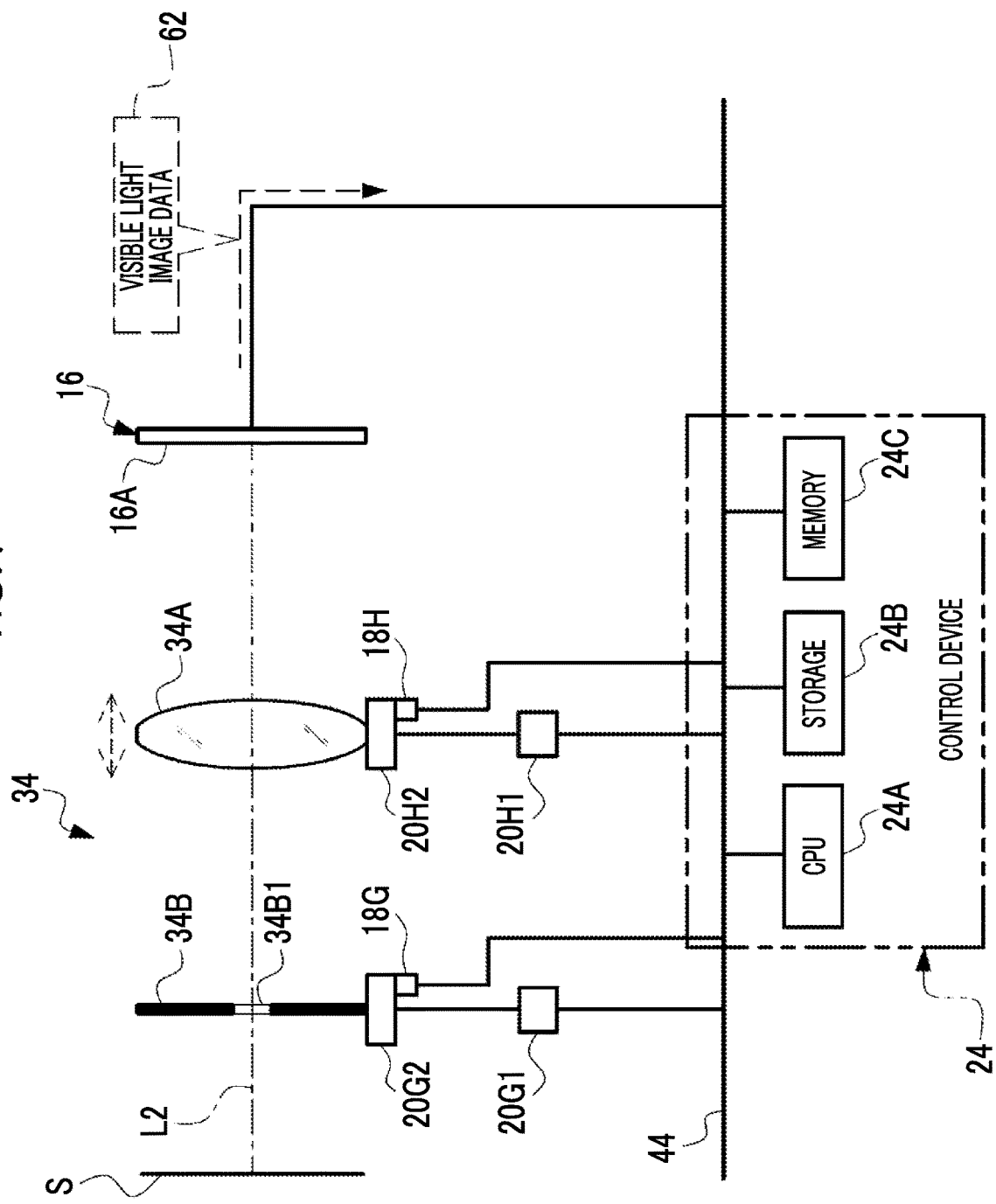
FIG. 7 is a schematic configuration diagram showing an example of hardware configurations of a third optical system provided in the imaging apparatus according to the first embodiment, and an electric system related to the third optical system.
Figure 8:
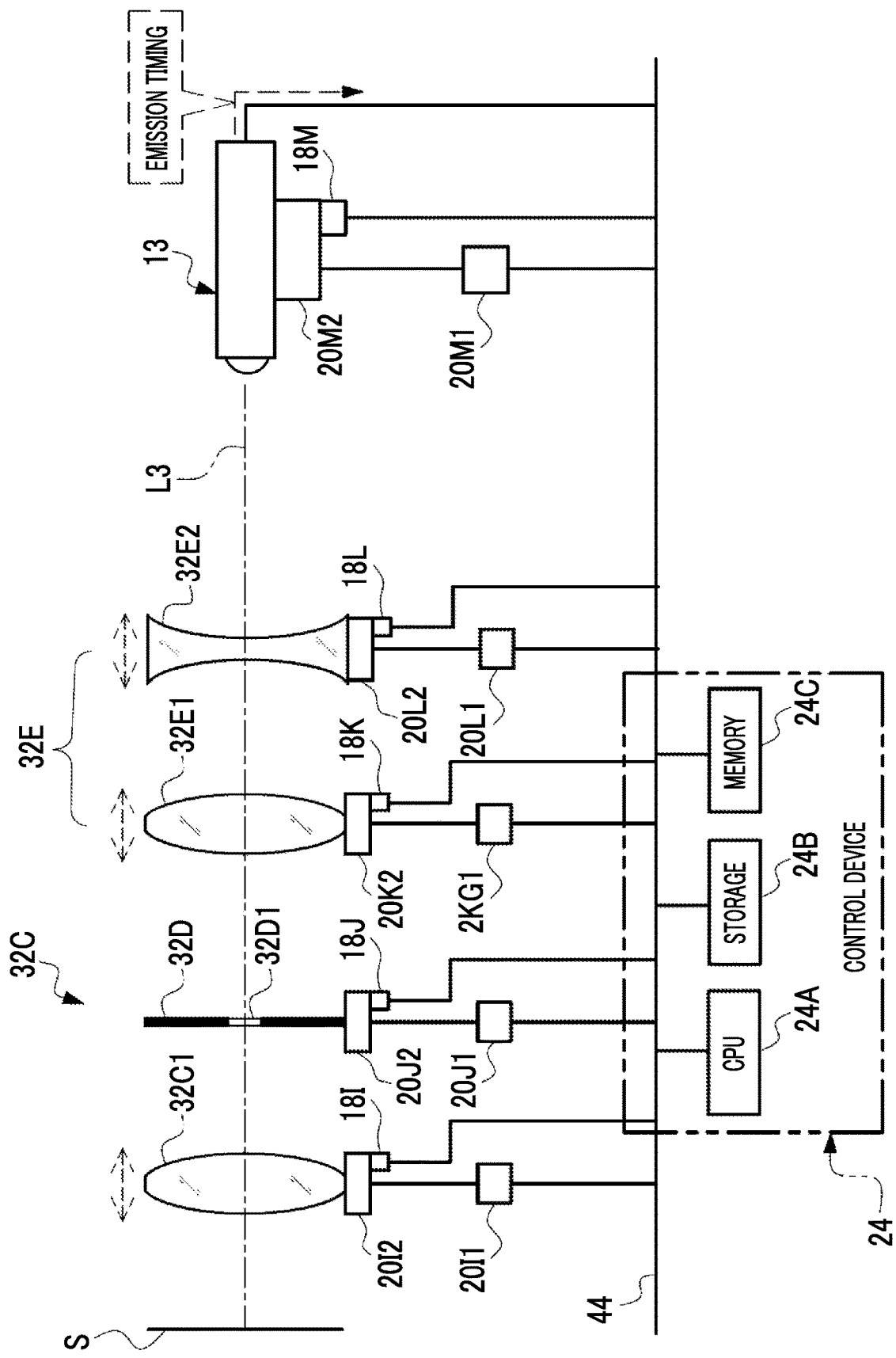
FIG. 8 is a schematic configuration diagram showing an example of hardware configurations of a light source optical system provided in the imaging apparatus according to the first embodiment, and an electric system related to the light source optical system.

As an example, as shown in FIG. 5, the control device 24 includes a CPU 24A, a storage 24B, and a memory 24C, and the CPU 24A, the storage 24B, and the memory 24C are connected to a bus 44.

It should be noted that, in the example shown in FIG. 5, one bus is shown as the bus 44 for convenience of illustration, but a plurality of buses may be used. The bus 44 may be a serial bus or may be a parallel bus including a data bus, an address bus, a control bus, and the like.

The storage 24B stores various parameters and various programs. The storage 24B is a non-volatile storage device. Here, an EEPROM is adopted as an example of the storage 24B. The EEPROM is merely an example, and an HDD and/or SSD or the like may be applied as the storage 24B instead of the EEPROM or together with the EEPROM. In addition, the memory 24C transitorily stores various pieces of information and is used as a work memory. Examples of the memory 24C include a RAM, but the technology of the present disclosure is not limited to this, and other types of storage devices may be used.

As an example, as shown in FIGS. 5 to 8, the position detection device 18 includes a first position sensor 18A, a second position sensor 18B, a third position sensor 18C, a fourth position sensor 18D, a fifth position sensor 18E, a sixth position sensor 18F, a seventh position sensor 18G, an eighth position sensor 18H, a ninth position sensor 18I, a tenth position sensor 18J, an eleventh position sensor 18K, a twelfth position sensor 18L, and a thirteenth position sensor 18M. The first position sensor 18A, the second position sensor 18B, the third position sensor 18C, the fourth position sensor 18D, the fifth position sensor 18E, the sixth position sensor 18F, the seventh position sensor 18G, the eighth position sensor 18H, the ninth position sensor 18I, the tenth position sensor 18J, the eleventh position sensor 18K, the twelfth position sensor 18L, and the thirteenth position sensor 18M are connected to the control device 24.

Here, as an example of each of the first position sensor 18A, the second position sensor 18B, the third position sensor 18C, the fourth position sensor 18D, the fifth position sensor 18E, the sixth position sensor 18F, the seventh position sensor 18G, the eighth position sensor 18H, the ninth position sensor 18I, the tenth position sensor 18J, the eleventh position sensor 18K, the twelfth position sensor 18L, and the thirteenth position sensor 18M, a potentiometer is adopted.

The first position sensor 18A, the second position sensor 18B, the third position sensor 18C, the fourth position sensor 18D, and the fifth position sensor 18E are used for the first optical system 28.

The first position sensor 18A detects a position of the first lens group 28A on the optical axis L1. The second position sensor 18B detects a position of the second lens group 28B on the optical axis L1. The third position sensor 18C detects a position of the third lens group 28C on the optical axis L1. The fourth position sensor 18D detects the diameter of the aperture 28E1.

The fifth position sensor 18E and the sixth position sensor 18F are used for the second optical system 32. The fifth position sensor 18E detects a position of the focus adjustment lens group 32B on the optical axis L1. The sixth position sensor 18F detects a position of the relay lens 32A on the optical axis L1.

The seventh position sensor 18G and the eighth position sensor 18H are used for the third optical system 34. The seventh position sensor 18G detects the diameter of the aperture 34B1. The eighth position sensor 18H detects a position of the relay lens 34A on the optical axis L3.

The ninth position sensor 18I, the tenth position sensor 18J, the eleventh position sensor 18K, the twelfth position sensor 18L, and the thirteenth position sensor 18M are used for the light source optical system 32C. The ninth position sensor 18I detects a position of the light distribution adjustment lens group 32C1 on the optical axis L3. The tenth position sensor 18J detects the diameter of the aperture 32D1. The eleventh position sensor 18K detects a position of the sixth lens group 32E1. The twelfth position sensor 18L detects a position of the seventh lens group 32E2. The thirteenth position sensor 18M detects a position of the light source 13.

In addition, as shown in FIGS. 5 to 8 as an example, the power applying device 20 includes a first motor driver 20A1, a second motor driver 20B1, a third motor driver 20C1, a fourth motor driver 20D1, a fifth motor driver 20E1, a sixth motor driver 20F1, a seventh motor driver 20G1, an eighth motor driver 20H1, a ninth motor driver 20I1, a tenth motor driver 20J1, an eleventh motor driver 20K1, a twelfth motor driver 20L1, and a thirteenth motor driver 20M1. In addition, the power applying device 20 includes a first moving mechanism 20A2 including a first motor (not shown), a second moving mechanism 20B2 including a second motor (not shown), a third moving mechanism 20C2, including a third motor (not shown), a fourth moving mechanism 20D2 including a fourth motor (not shown), a fifth moving mechanism 20E2 including a fifth motor (not shown), a sixth moving mechanism 20F2 including a sixth motor (not shown), a seventh moving mechanism 20G2 including a seventh motor (not shown), an eighth moving mechanism 20H2 including an eighth motor (not shown), a ninth moving mechanism 20I2 including a ninth motor (not shown), a tenth moving mechanism 20J2 including a tenth motor (not shown), an eleventh moving mechanism 20K2 including an eleventh motor (not shown), a twelfth moving mechanism 20L2 including a twelfth motor (not shown), and a thirteenth moving mechanism 20M2 including a thirteenth motor (not shown).

The first motor driver 20A1, the second motor driver 20B1, the third motor driver 20C1, the fourth motor driver 20D1, the fifth motor driver 20E1, the sixth motor driver 20F1, the seventh motor driver 20G1, the eighth motor driver 20H1, the ninth motor driver 20I1, the tenth motor driver 20J1, the eleventh motor driver 20K1, the twelfth motor driver 20L1, and the thirteenth motor driver 20M1 are connected to the control device 24, and are controlled by the control device 24. Each motor driver is connected to the corresponding motor and controls the motor in accordance with an instruction from the control device 24.

The first motor driver 20A1, the second motor driver 20B1, the third motor driver 20C1, the fourth motor driver 20D1, the first moving mechanism 20A2, the second moving mechanism 20B2, the third moving mechanism 20C2, and the fourth moving mechanism 20D2 are used for the first optical system 28.

The first lens group 28A is connected to the first moving mechanism 20A2. The first moving mechanism 20A2 is operated by receiving the power generated by the first motor under the control of the first motor driver 20A1 to move the first lens group 28A in the direction of the optical axis L1. The second lens group 28B is connected to the second moving mechanism 20B2. The second moving mechanism 20B2 is operated by receiving the power generated by the second motor under the control of the second motor driver 20B1 to move the second lens group 28B in the direction of the optical axis L1. The third lens group 28C is connected to the third moving mechanism 20C2. The third moving mechanism 20C2 is operated by receiving the power generated by the third motor under the control of the third motor driver 20C1 to move the third lens group 28C in the direction of the optical axis L1. The stop 28E is connected to the fourth moving mechanism 20D2. The fourth moving mechanism 20D2 is operated by receiving the power generated by the fourth motor under the control of the fourth motor driver 20D1 to adjust an aperture degree of the aperture 28E1 of the stop 28E.

The fifth motor driver 20E1, the sixth motor driver 20F1, the fifth moving mechanism 20E2, and the sixth moving mechanism 20F2 are used for the second optical system 32.

The focus adjustment lens group 32B is connected to the fifth moving mechanism 20E2. The fifth moving mechanism 20E2 is operated by receiving the power generated by the fifth motor under the control of the fifth motor driver 20E1 to move the focus adjustment lens group 32B in the direction of the optical axis L1. The relay lens 32A is connected to the sixth moving mechanism 20F2. The sixth moving mechanism 20F2 is operated by receiving the power generated by the sixth motor under the control of the sixth motor driver 20F1 to move the relay lens 32A in the direction of the optical axis L1.

The seventh motor driver 20G1, the eighth motor driver 20H1, the seventh moving mechanism 20G2, and the eighth moving mechanism 20H2 are used for the third optical system 34.

The stop 34B is connected to the seventh moving mechanism 20G2. The seventh moving mechanism 20G2 is operated by receiving the power generated by the seventh motor under the control of the seventh motor driver 20G1 to adjust an aperture degree of the aperture 34B1 of the stop 34B. The relay lens 34A is connected to the eighth moving mechanism 20H2. The eighth moving mechanism 20H2 is operated by receiving the power generated by the eighth motor under the control of the eighth motor driver 20H1 to move the relay lens 34A in the direction of the optical axis L2.

The ninth motor driver 20I1, the tenth motor driver 20J1, the eleventh motor driver 20K1, the twelfth motor driver 20L1, the thirteenth motor driver 20M1, the ninth moving mechanism 20I2, the tenth moving mechanism 20J2, the eleventh moving mechanism 20K2, the twelfth moving mechanism 20L2, and the thirteenth moving mechanism 20M2 are used for the light source optical system 32C.

The light distribution adjustment lens group 32C1 is connected to the ninth moving mechanism 20I2. The ninth moving mechanism 20I2 is operated by receiving the power generated by the ninth motor under the control of the ninth motor driver 20I1 to move the light distribution adjustment lens group 32C1 in a direction of the optical axis L3. The light source stop 32D is connected to the tenth moving mechanism 20J2. The tenth moving mechanism 20J2 is operated by receiving the power generated by the tenth motor under the control of the tenth motor driver 20J1 to adjust an aperture degree of the aperture 32D1 of the light source stop 32D. The sixth lens group 32E1 is connected to the eleventh moving mechanism 20K2. The eleventh moving mechanism 20K2 is operated by receiving the power generated by the eleventh motor under the control of the eleventh motor driver 20K1 to move the sixth lens group 32E1 in the direction of the optical axis L3. The seventh lens group 32E2 is connected to the twelfth moving mechanism 20L2. The twelfth moving mechanism 20L2 is operated by receiving the power generated by the twelfth motor under the control of the twelfth motor driver 20L1 to move the seventh lens group 32E2 in the direction of the optical axis L3. The light source 13 is connected to the thirteenth moving mechanism 20M2. The thirteenth moving mechanism 20M2 is operated by receiving the power generated by the thirteenth motor under the control of the thirteenth motor driver 20M1 to change an emission angle of infrared light. For example, the thirteenth moving mechanism 20M2 is a so-called pan tilt mechanism, and allows the light source 13 to perform swing operation selectively in vertical and horizontal directions to change the emission angle of the infrared light by receiving the power from the thirteenth motor.

As described above, in the imaging apparatus 10 according to the technology of the present disclosure, the subject light is separated by the first separation prism 30, and imaging both the infrared light and the visible light is realized by using the first image sensor 14 and the second image sensor 16. Further, in the imaging apparatus 10, it is possible to irradiate the subject S with the infrared light from the light source 13 to secure the light amount in the imaging of the infrared light. For example, in a case in which the light source cannot sufficiently secure a sufficient light amount of the infrared light, such as a case in which imaging at night or a case in which a bandpass filter is provided in the optical system of the imaging apparatus 10, the light amount can be secured by irradiating the subject S with the infrared light from the light source 13.

On the other hand, in the imaging apparatus 10, there is a possibility that the infrared light emitted from the light source 13 is partially reflected by the optical element (for example, the lens or the prism) in the imaging apparatus 10 to generate stray light. Such stray light is imaged by the first image sensor 14, and causes noise or the like to be caused in the image data obtained by imaging.

Figure 9:
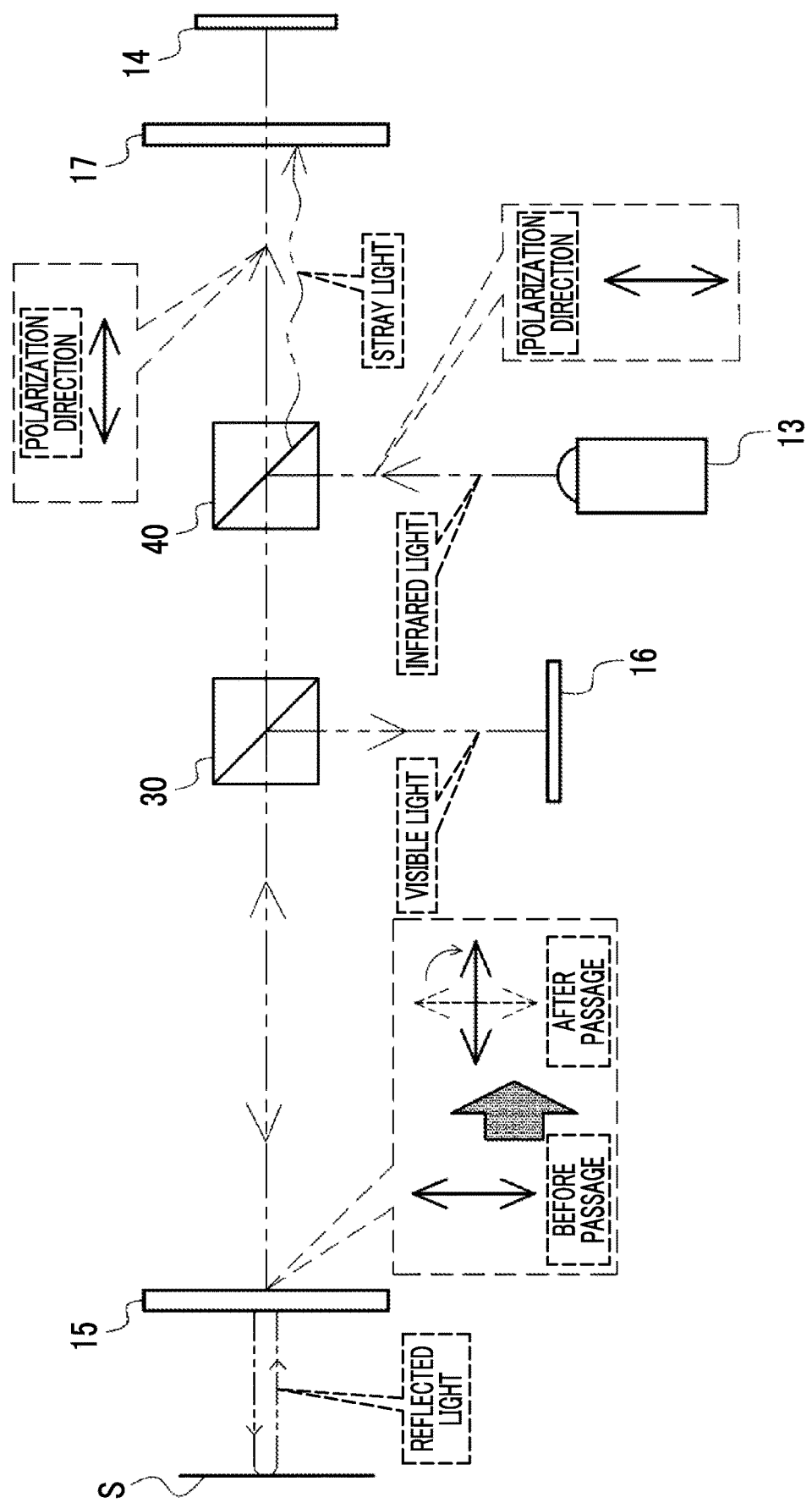
FIG. 9 is a conceptual diagram used for describing the removal of stray light in the imaging apparatus according to the first embodiment.

Therefore, as shown in FIG. 9 as an example, the imaging apparatus 10 according to the technology of the present disclosure includes the phase plate 15 and the polarizing plate 17 in order to remove the stray light caused by the infrared light emitted from the light source 13. Specifically, first, the infrared light polarized in the predetermined polarization direction is emitted from the light source 13. The infrared light emitted from the light source 13 along the optical axis L3 is reflected by the second separation prism 40 to pass on the optical axis L1 of the first optical system 28. Thereafter, the infrared light is emitted from the first optical system 28 to the subject S. In this case, the phase of the infrared light is converted by the phase plate 15 provided on the subject S side of the first optical system 28. As an example, in a case in which the phase plate 15 is the ¼ phase plate, the phase is changed by ¼ wavelength. As a result, a polarization state of the infrared light emitted from the first optical system 28 is changed.

The infrared light emitted from the first optical system 28 is reflected by the subject S and is incident on the first optical system 28 again. In addition, as the subject light indicating the subject S, the visible light is incident on the first optical system 28 together with the infrared light. In this case, the subject light passes through the phase plate 15. Among the light beams included in the subject light, the infrared light emitted from the light source 13 passes through the phase plate 15 in a case of being emitted from the first optical system 28, so that the phase is converted again. As an example, in a case in which the phase plate 15 is the ¼ phase plate, the phase is changed again by ¼ wavelength, and the infrared light that is circularly polarized light becomes linearly polarized light. In this case, the infrared light emitted from the light source 13 changes its polarization direction by 90 degrees with respect to the polarization direction in a case of being emitted from the light source 13.

The subject light that passes through the first optical system 28 is separated into the visible light and the infrared light by the first separation prism 30. The infrared light travels along the optical axis L1 and is transmitted through the second optical system 32. The polarizing plate 17 is provided in a subsequent stage of the second optical system 32. The polarizing plate 17 allows only light in the predetermined polarization direction to pass. Specifically, examples of the predetermined polarization direction include the polarization direction of the infrared light after the infrared light emitted from the light source 13 is emitted from the phase plate 15 and is incident on the phase plate 15. Therefore, among the infrared light beams transmitted through the second optical system 32, the infrared light emitted from the light source 13 and reflected by the subject S, that is, the infrared light indicating the subject S is transmitted through the polarizing plate 17, and is received by the first image sensor 14. On the other hand, the stray light, which is the infrared light that is emitted from the light source 13, is not emitted from the first optical system 28, and does not pass through the phase plate 15 twice, does not have the predetermined polarization direction, and thus passing through the polarizing plate 17 is suppressed. As a result, it is possible to perform imaging of the infrared light in which the light amount is secured by the light source 13 while reducing the influence of the stray light.

In addition, the visible light included in the subject light is separated by the first separation prism 30, travels along the optical axis L2, and is received by the second image sensor 16. On the other hand, with respect to the stray light due to the infrared light emitted from the light source 13, the second image sensor 16 has no sensitivity in the infrared wavelength range, so that imaging by the visible light is not affected.

Figure 10:
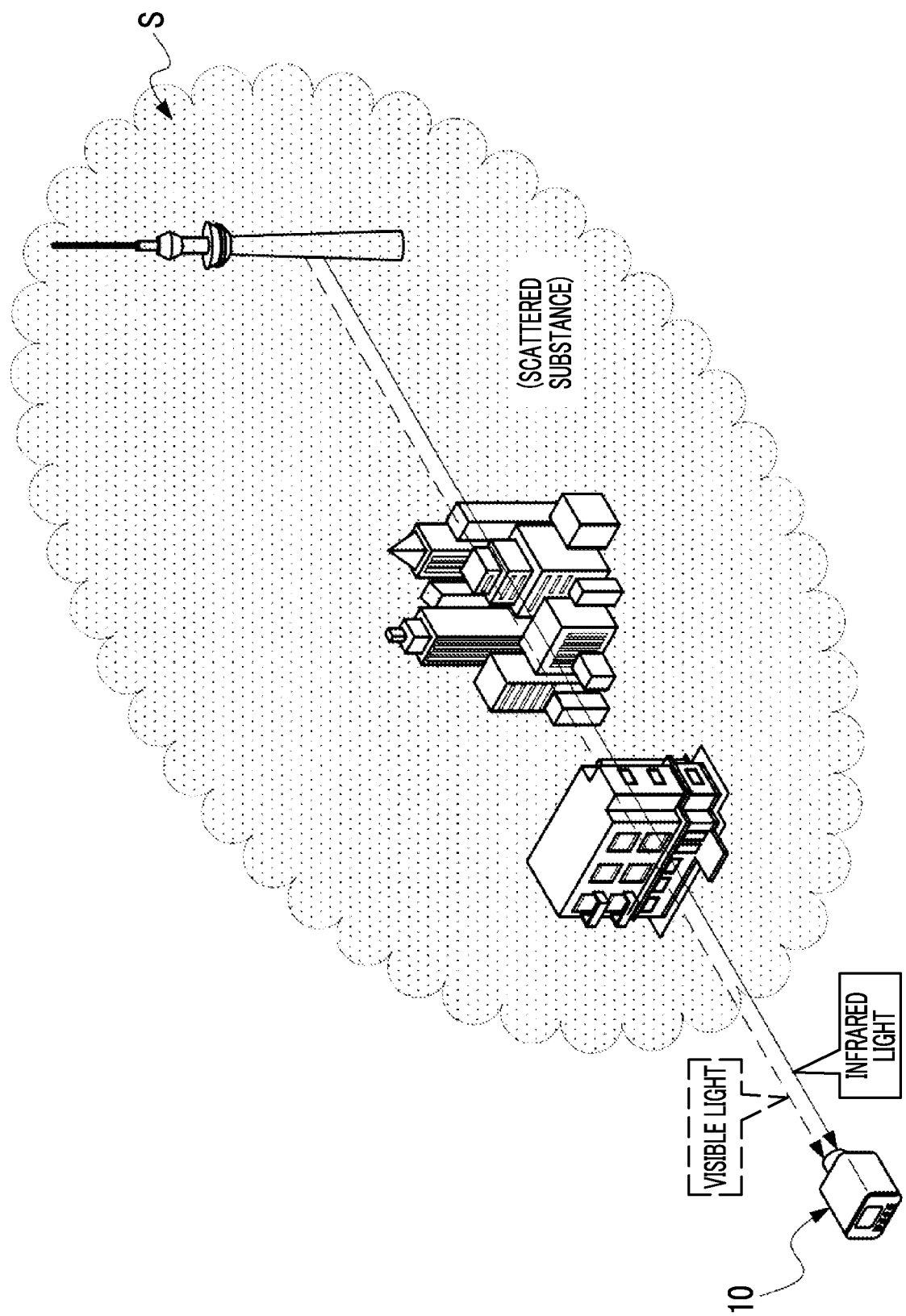
FIG. 10 is a conceptual diagram showing an example of a function of the imaging apparatus according to the first embodiment.

By the way, as shown in FIG. 10 as an example, scattered substances, such as fine particles (for example, steam and dust), are present in the atmosphere as a substance causing scattering, and the subject light passing through the atmosphere is affected by the scattering of light (hereinafter, also simply referred to as "scattering") by the scattered substance. In particular, out of the visible light and the infrared light included in the subject light, the visible light has a shorter wavelength than the infrared light, and thus the influence of scattering in the atmosphere than infrared light is more than the infrared light. Therefore, it is known that the light amount of the visible light in the subject light received by the second image sensor 16 of the imaging apparatus 10 is reduced as the distance from the imaging apparatus 10 is increased. On the other hand, as described above, the infrared light has higher transmittance to scattered substances than transmittance to the visible light, and thus it is possible to perform longer-distance imaging in a case in which the infrared light is used. However, although the near-infrared light has excellent transmittance to scattered substances, imaging in a single color is performed, and it is difficult to identify the subject by using the color.

Figure 11:
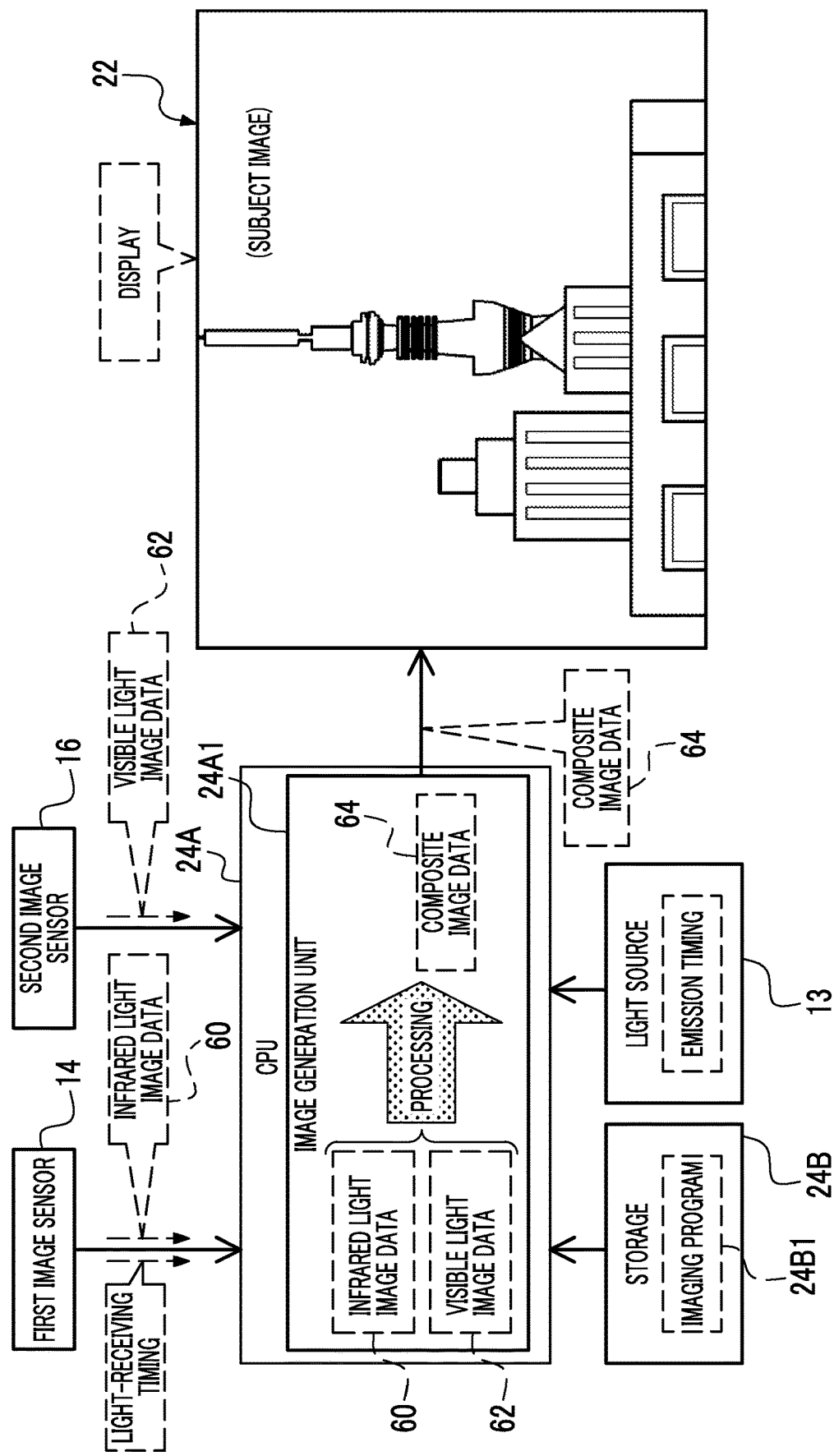
FIG. 11 is a conceptual diagram showing an example of the function of the imaging apparatus according to the first embodiment.

Therefore, by performing imaging using both the infrared light and the visible light by the imaging apparatus 10, it is possible to simultaneously obtain information by the visible light as well as information by the infrared light. As an example, as shown in FIG. 11, the CPU 24A is operated as an image generation unit 24A1 by reading out an imaging program 24B1 from the storage 24B and executing the read out imaging program 24B1 on the memory 24C. It should be noted that the CPU 24A is an example of a "first processor" according to the technology of the present disclosure. The image generation unit 24A1 acquires infrared light image data 60 obtained by being imaged by the first image sensor 14 and visible light image data 62 obtained by being imaged by the second image sensor 16. The image generation unit 24A1 synthesizes the infrared light image data 60 and the visible light image data 62 by superimposing one of the infrared light image data 60 and the visible light image data 62 on the other thereof, to generate composite image data 64. Moreover, the image generation unit 24A1 causes the display of the UI system device 22 to display the subject image (image showing the subject S) indicated by the composite image data 64. As described above, the information by the visible light that can identify the subject S by color can also be obtained in addition to the information on the infrared light having high transmittance with respect to the scattered substance by the composite image data 64 obtained by the imaging apparatus 10, and the user can visually recognize the subject S through the display.

In addition, as shown in FIG. 11 as an example, the image generation unit 24A1 further performs removal processing of the noise due to the stray light or the like on the composite image data 64 based on the light-receiving timing signal and the emission timing signal. That is, it is determined whether the stray light is received or the subject light is received, based on a flight time, which is a time required from the irradiation with the infrared light by the light source 13 to the reception of the infrared light by the first image sensor 14. Specifically, first, the image generation unit 24A1 acquires the light-receiving timing signal and the emission timing signal, and calculates the flight time. Next, the image generation unit 24A1 acquires a threshold value for flight time determination stored in the storage 24B in advance and compares the threshold value with the flight time to determine whether the infrared light received by the first image sensor 14 is the stray light or the infrared light included in the subject light. Moreover, based on such a determination result, the image generation unit 24A1 performs processing of removing the image data indicating the stray light from the infrared light image data 60 obtained by being imaged by the first image sensor 14 in a case in which the stray light is received.

As described above, in the imaging apparatus 10, the subject light incident on the first optical system 28 is separated into the infrared light and the visible light by the first separation prism 30, and the infrared light and the visible light are imaged by the first image sensor 14 and the second image sensor 16, respectively, so that it is possible to image both the infrared light and the visible light. In addition, the light source 13 that emits the infrared light is provided to compensate for an insufficient light amount of the infrared light, and the infrared light from such a light source 13 is emitted from the first optical system 28, so that the optical axis of the optical system for imaging and the optical axis of the optical system for the projection are coaxial in the first optical system 28. Therefore, as compared with a case in which the optical axis of the imaging system and the optical axis of the projection system are separate, it is possible to image the subject light in a state in which the irradiation range of the infrared light and the imaging range in which the infrared light and the visible light are imaged are accurately superimposed.

In particular, as the subject S is positioned farther from the imaging apparatus 10, the accuracy of matching between the optical axis of the optical system for imaging and the optical axis of the optical system for the irradiation is required. In addition, in a case in which the light emitted to the subject is the infrared light, it is difficult to visually recognize the irradiation range, and thus it is difficult to perform the adjustment with the naked eye. In the imaging apparatus 10, since the optical system for imaging and the optical system for the projection are coaxial optical systems, it is possible to image the subject light in a state in which the irradiation range of the infrared light and the imaging range in which the infrared light and the visible light are imaged are accurately superimposed.

In addition, in the imaging apparatus 10, the first optical system 28 includes the fifth lens group 28F that is immovable along an optical axis direction. Even in this case, the infrared light emitted from the light source 13 is emitted from the first optical system 28 by allowing the infrared light to pass through the optical path on which the reflected light from the subject S passes through the fifth lens group 28F, and thus it is possible to image the subject light in a state in which the irradiation range of the infrared light and the imaging range are superimposed.

In addition, in the imaging apparatus 10, the first optical system 28 includes a zooming optical system consisting of the second lens group 28B and the third lens group 28C that can be moved along the optical axis direction. Even in a case in which the zooming optical system is operated, the infrared light emitted from the light source 13 is emitted from the first optical system 28 by allowing the infrared light to pass through an optical path on which the reflected light from the subject S passes through the zooming optical system consisting of the second lens group 28B and the third lens group 28C, and further passes through the fifth lens group 28F that is immovable in the optical axis direction, and thus it is possible to image the subject light in a state in which the irradiation range of the infrared light and the imaging range are superimposed.

In addition, in the imaging apparatus 10, the first separation prism 30 and the first optical system 28 emit the infrared light emitted from the light source 13 from the first optical system 28 by allowing the infrared light to pass through at least a part of an optical path on which the reflected light from the subject S goes toward the first image sensor 14 through the first optical system 28 and the first separation prism 30. Therefore, the infrared light can be imaged in a state in which the irradiation range of the infrared light and the imaging range are superimposed.

In addition, in the imaging apparatus 10, since the first separation prism 30 allows the infrared light included in the reflected light from the subject S along the optical axis of the first optical system 28 to pass and reflects the visible light in the direction intersecting the optical axis of the first optical system 28, as compared with a case in which the infrared light is reflected and imaged by the first image sensor 14, there is no need to control a reflection characteristic required for the first separation prism 30 with a high accuracy (for example, control of the film thickness), and thus the manufacturing cost of the imaging apparatus 10 can be reduced.

In addition, in the imaging apparatus 10, the second separation prism 40 reflects the infrared light emitted from the light source 13, allows the infrared light to pass through a part of the optical path on which the reflected light from the subject S goes toward the first image sensor 14, and guides the infrared light to the first separation prism 30. Therefore, as compared with a case in which the second separation prism 40 is not used, the infrared light emitted from the light source 13 can be guided to the optical path through which the reflected light from the subject S passes with a simple configuration.

In addition, in the imaging apparatus 10, the infrared light, which passes through the phase plate 15 and of which the polarization direction is changed, passes through the polarizing plate 17 and is imaged by the first image sensor 14, and thus imaging of the stray light caused by the infrared light emitted from the light source 13 being incident on the optical system by the first image sensor 14 is suppressed, as compared with a case in which the polarizing plate 17 that polarizes the infrared light and guides the polarized infrared light to the first image sensor 14 is not provided.

In addition, in the imaging apparatus 10, the polarization direction of the infrared light emitted from the light source 13 due to the passage of the phase plate 15 is changed in the direction intersecting the direction before the passage. Therefore, light in a direction other than the polarization direction is easily blocked by the polarizing plate, and imaging of the stray light caused by the infrared light emitted from the light source 13 being incident on the optical system by the first image sensor 14 can be suppressed.

In addition, in the imaging apparatus 10, the phase plate 15 is the ¼ phase plate, and the infrared light is incident on and emitted from the ¼ phase plate and passes through the ¼ phase plate twice, to that the polarization direction of the infrared light is changed by 90 degrees. Therefore, as compared with a case in which the infrared light is polarized by 90 degrees by a method other than the method in which the infrared light is incident on and emitted from the ¼ phase plate, imaging of the stray light caused by the infrared light emitted from the light source 13 being incident on the optical system by the first image sensor 14 can be easily suppressed.

In addition, in the imaging apparatus 10, the image generation unit 24A1 generates the image data for the subject light based on the emission timing at which the infrared light is emitted from the light source 13 and the light-receiving timing at which the infrared light included in the reflected light from the subject S is received by the first image sensor 14, and thus it is possible to obtain the image data based on the information on the distance to the subject S.

In addition, in the imaging apparatus 10, the subject light is separated into the visible light and the long-wavelength light having a longer wavelength than the visible light by the first separation prism 30, the subject S imaged for the visible light by the second image sensor 16, and the subject S is imaged for the long-wavelength light having a longer wavelength than the visible light by the first image sensor 14. Therefore, it is possible to obtain the image showing the subject S for the visible light and the image showing the subject S for the long-wavelength light having a longer wavelength than the visible light.

In addition, in the imaging apparatus 10, as the long-wavelength light which is the infrared light, the light in the infrared wavelength range of 1400 nm or more and 2600 nm or less and in a wavelength range that has a relatively little influence on human eyes is used, so that the output of the infrared light can be increased as compared with a case in which the infrared light in other wavelength ranges is used.

In addition, in the imaging apparatus 10, as compared with a configuration in which the light source stop 32D, which is provided between the light source 13 and the first optical system 28 and limits the light amount of the infrared light emitted from the light source 13, is not provided, it is possible to change a spot diameter of the infrared light emitted from the light source 13.

In addition, in the imaging apparatus 10, the first optical system 28 includes a plurality of lenses, and the anti-reflection film that makes the reflectivity to the infrared light and the visible light lower than that in other wavelength ranges is formed in at least one lens, and thus it is possible to reduce the number of the anti-reflection films and reduce the manufacturing cost, as compared with a configuration in which an anti-reflection film that reduces the reflectivity of all wavelength ranges is formed on the lens.

In addition, in the imaging apparatus 10, the transmittance of the infrared light is higher than that of the visible light as compared with a configuration in which the stop 28E of the first optical system 28 has the same transmittance for all wavelength ranges, and thus it is possible to secure the light amount of the infrared light while limiting the light amount of the visible light.

In addition, in the imaging apparatus 10, since the second optical system 32 includes the focus adjustment lens group 32B, the imaging position of the infrared light with respect to the first image sensor 14 can be adjusted.

In addition, in the imaging apparatus 10, the light distribution adjustment lens group 32C1 that can adjust the light distribution of the infrared light emitted from the light source 13 is provided between the light source 13 and the optical path through which the subject light passes, and thus it is possible to adjust the spot diameter of the infrared light emitted from the light source 13.

In addition, in the imaging apparatus 10, the beam expander optical system 32E that can adjust the beam diameter of the infrared light emitted from the light source 13 is provided, and thus it is possible to adjust the beam diameter of the infrared light emitted from the light source 13.

In addition, in the imaging apparatus 10, the light source 13 includes the Brewster window 13A, and thus the infrared light emitted from the light source 13 can be the linearly polarized light with high purity as compared with a configuration in which the light source 13 does not include the Brewster window 13A.

In addition, in the imaging apparatus 10, the light source 13 can change the emission direction of infrared light, and thus it is possible to change the irradiation range of the infrared light emitted from the light source 13 as compared with a configuration in which the light source 13 cannot change the emission direction of the infrared light.

It should be noted that, in the first embodiment, the light having the infrared wavelength range of 1400 nm or more and 2600 nm or less has been described as an example of the infrared light, but this is merely an example, and the infrared light need only be the long-wavelength light having a longer wavelength than the wavelength range of the visible light, for example, light having the near-infrared wavelength range including 1550 nm may be applied. As described above, by the imaging apparatus 10 performing imaging using the light in the near-infrared light wavelength range including 1550 nm and the visible light, visual information of both the light in the near-infrared light wavelength range including 1550 nm and the visible light is obtained, and it is possible to perform imaging that is not easily affected by scattered substances in the atmosphere as compared with a case in which light on a shorter wavelength side than the near-infrared light wavelength range including 1550 nm is imaged as the infrared light.

In addition, as the long-wavelength light having a longer wavelength than the wavelength range of the visible light, light having the near-infrared wavelength range of 750 nm or more and 1000 nm or less may be applied. As described above, the imaging apparatus 10 performs imaging by using the light in the near-infrared wavelength range of 750 nm or more and 1000 nm or less and the visible light, and thus it is possible to detect the first wavelength range light without using the InGaAs photodiode.

It should be noted that, since the wavelength range of the near-infrared light has various interpretations depending on theories and the like, the wavelength range defined as the wavelength range of the near-infrared light need only be determined in accordance with the application of the imaging apparatus 10. In addition, the same applies to the wavelength range of the visible light.

In addition, in the first embodiment, the form example has been described in which the image generation unit 24A1 generates the composite image data 64 or the composite image data 64 in which the influence of the stray light is reduced, but the technology of the present disclosure is not limited to this. For example, the image generation unit 24A1 may generate the composite image data 64 including the information on the distance to the subject S.

Specifically, in the imaging apparatus 10, the distance from the imaging apparatus 10 to the subject S is measured based on the time required from the irradiation with the infrared light by the light source 13 to the reception of the infrared light included in the subject light by the first image sensor 14, and a light speed. For example, in a case in which the distance to the subject S, which is a distance measurement target, is denoted by "L", the light speed is denoted by "c", and the time required from the emission of the infrared light by the light source 13 to the reception of the reflected light by the first image sensor 14 is denoted by "t", the distance L is calculated in accordance with an expression "L=c×t×0.5". In this case, the first image sensor 14 is a so-called TOF image sensor. The image generation unit 24A1 derives the information on the distance to the subject S based on the acquired emission timing signal and light-receiving timing signal, and the calculation expression. It should be noted that the CPU 24A that functions as the image generation unit 24A1 is an example of a "second processor" according to the technology of the present disclosure.

As described above, the image generation unit 24A1 measures the distance to the subject S based on the emission timing at which the infrared light is emitted from the light source 13, and the light-receiving timing at which the reflected light from the subject S is received by the first image sensor 14. Therefore, the distance to the subject S can be measured by using the infrared light used as illumination light for imaging, and it is not required to newly install an illumination device dedicated to distance measurement. As a result, the distance to the subject S can be measured with a simple configuration as compared with a case in which the illumination device dedicated to distance measurement is newly installed separately from the light source 13.

In addition, in the imaging apparatus 10, the irradiation with the infrared light for distance measurement can be performed coaxially with the optical system for imaging, and thus the accuracy of measurement of the distance to the subject S is improved as compared with a case in which the illumination device dedicated to distance measurement having an optical axis separate from the optical axis for imaging.

In addition, in the first embodiment, in the first optical system 28, the form example in which the lens group includes the anti-reflection film 19 or the form example in which the stop leaf blade 28E3 of the stop 28E has higher transmittance to the infrared light than transmittance to the visible light has been described, but the technology of the present disclosure is not limited to this. In addition, in the first embodiment, in the second optical system 32, the form example has been described in which the focus adjustment lens group 32B, the light distribution adjustment lens group 32C1, the light source stop 32D, or the beam expander optical system 32E is provided, but the technology of the present disclosure is not limited to this, and the technology of the present disclosure is established even in a case in which the focus adjustment lens group 32B, the light distribution adjustment lens group 32C1, the light source stop 32D, or the beam expander optical system 32E is not provided. In addition, in the first embodiment, the embodiment has been described in which the light source 13 includes the Brewster window 13A, but the technology of the present disclosure is established without the Brewster window 13A.

In addition, in the first embodiment, in the imaging apparatus 10, the form example has been described in which the optical system that images the infrared light and the visible light and the optical system that emits the infrared light from the light source 13 are coaxial in a part of the optical path of the first optical system 28, but the technology of the present disclosure is not limited to this, and the optical system for imaging the infrared light and the visible light and the optical system that emits the infrared light from the light source 13 may be coaxial in all the optical paths of the first optical system.

In addition, in the first embodiment, the form example has been described in which the first optical system 28 emits the infrared light emitted from the light source 13 to the subject S by allowing the infrared light to pass through all the optical paths on which the subject light goes toward the first image sensor 14 through the fifth lens group 28F which is the stationary lens group in the first optical system 28, and the technology of the present disclosure is not limited to this. For example, the first optical system 28 may allow the infrared light emitted from the light source 13 to pass through a part of the optical path on which the subject light goes toward the first image sensor 14 through the fifth lens group 28F which is the stationary lens group in the first optical system 28.

In addition, in the first embodiment, the form example has been described in which the first optical system 28 emits the infrared light emitted from the light source 13 to the subject S by allowing the infrared light to pass through all the optical paths on which the subject light goes toward the first image sensor 14 through the zoom lens consisting of lenses of four groups and the fifth lens group 28F which is the stationary lens group in the first optical system 28, and the technology of the present disclosure is not limited to this. For example, the first optical system 28 may allow the infrared light emitted from the light source 13 to pass through the optical path on which the subject light goes toward the first image sensor 14 through the fifth lens group 28F which is the stationary lens group in the first optical system 28. Stated another way, the infrared light emitted from the light source 13 is configured to be guided to the optical axis L1 on the image side with respect to the fifth lens group 28F, which is the stationary lens group.

Second Embodiment

In the first embodiment, the form example has been described in which an optical axis of the second optical system 32 is coaxial with the optical axis L1 of the first optical system 28. However, in a second embodiment, a form example will be described in which the optical axis of the second optical system 32 intersects the optical axis L1 of the first optical system 28. It should be noted that, in the second embodiment, the components different from the components described in the first embodiment will be designated by the same reference numerals, and description thereof will be omitted.

Figure 12:
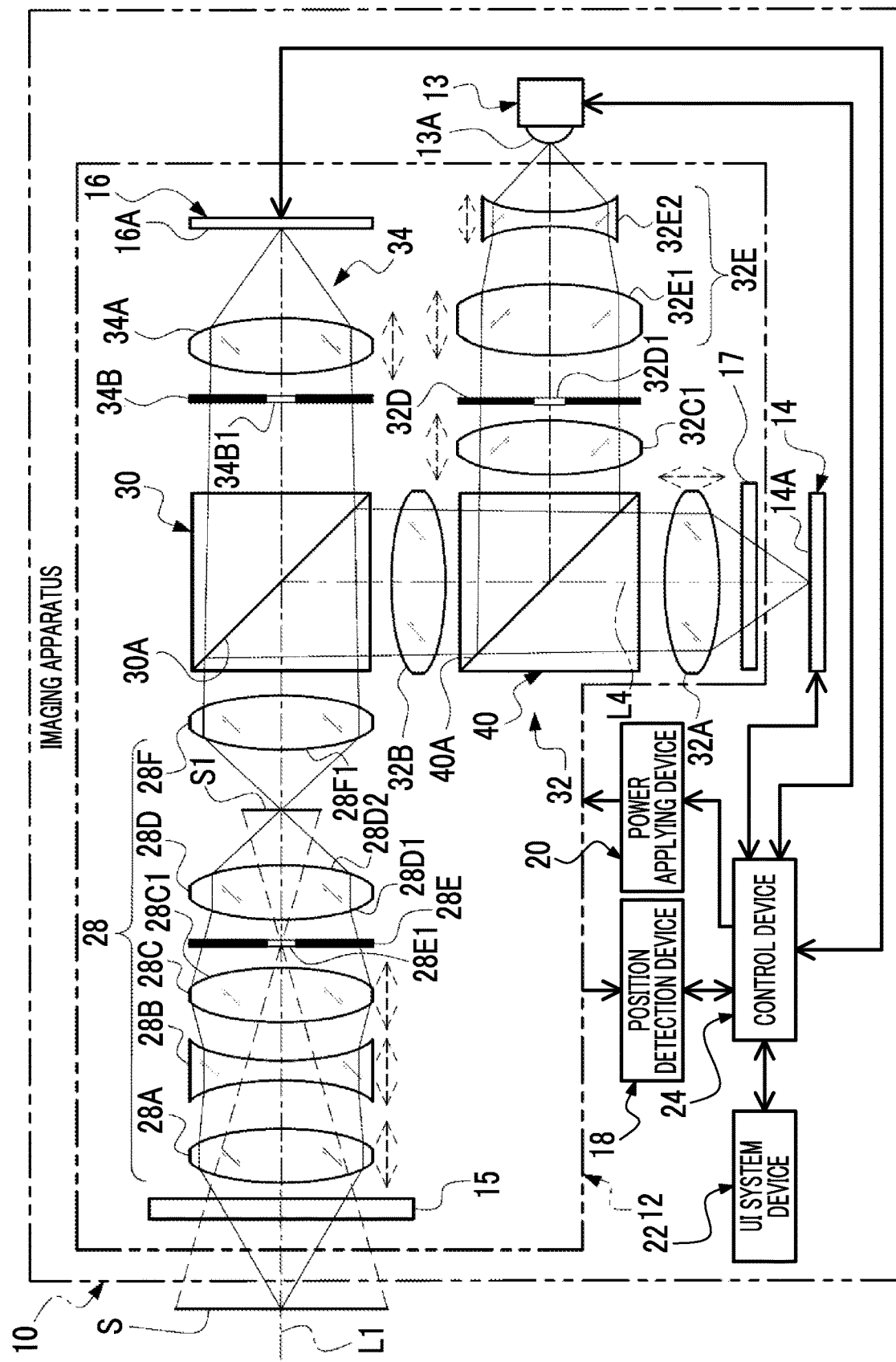
FIG. 12 is a schematic configuration diagram showing an example of a configuration of an imaging apparatus according to a second embodiment.

As an example, as shown in FIG. 12, an optical axis L4 of the second optical system 32 intersects the optical axis L1 of the first optical system 28. Specifically, the second optical system 32 is disposed on the image side with respect to the first separation prism 30 along the direction of the optical axis L4. Stated another way, the second optical system 32 is disposed on a side on which the infrared light is emitted from the first separation prism 30, in the outside of the first separation prism 30. The third optical system 34 is disposed along the optical axis L1 on the image side with respect to the first separation prism 30. The third optical system 34 transmits the visible light along the optical axis L1.

The first separation prism 30 transmits the visible light and reflects the infrared light. That is, the first separation prism 30 guides the visible light to the third optical system 34 along the optical axis L1 and guides the infrared light to the second optical system 32 along the optical axis L4.

As described above, in the imaging apparatus 10, the second optical system 32 can be disposed such that the optical axis L4 of the second optical system 32 that transmits the infrared light separated from the subject light by the first separation prism 30 is positioned in a direction intersecting the optical axis L1 of the first optical system 28. Therefore, as compared with a case in which the optical axis of the second optical system 32 cannot intersect the optical axis L1 of the first optical system 28, a degree of freedom in disposing the optical element or the light source 13 is improved, and a degree of freedom in designing the imaging apparatus 10 is improved.

Third Embodiment

In the first embodiment, the form example has been described in which the distance between the subject S and the imaging apparatus 10 is measured based on the emission timing of the near-infrared light from the light source 13 and the light-receiving timing by the first image sensor 14. In a third embodiment, a form example will be described in which the imaging apparatus 10 includes a distance-measuring device 50 that measures the distance between the subject S and the imaging apparatus 10. It should be noted that, in the third embodiment, the components different from the components described in the first embodiment will be designated by the same reference numerals, and description thereof will be omitted.

Figure 13:
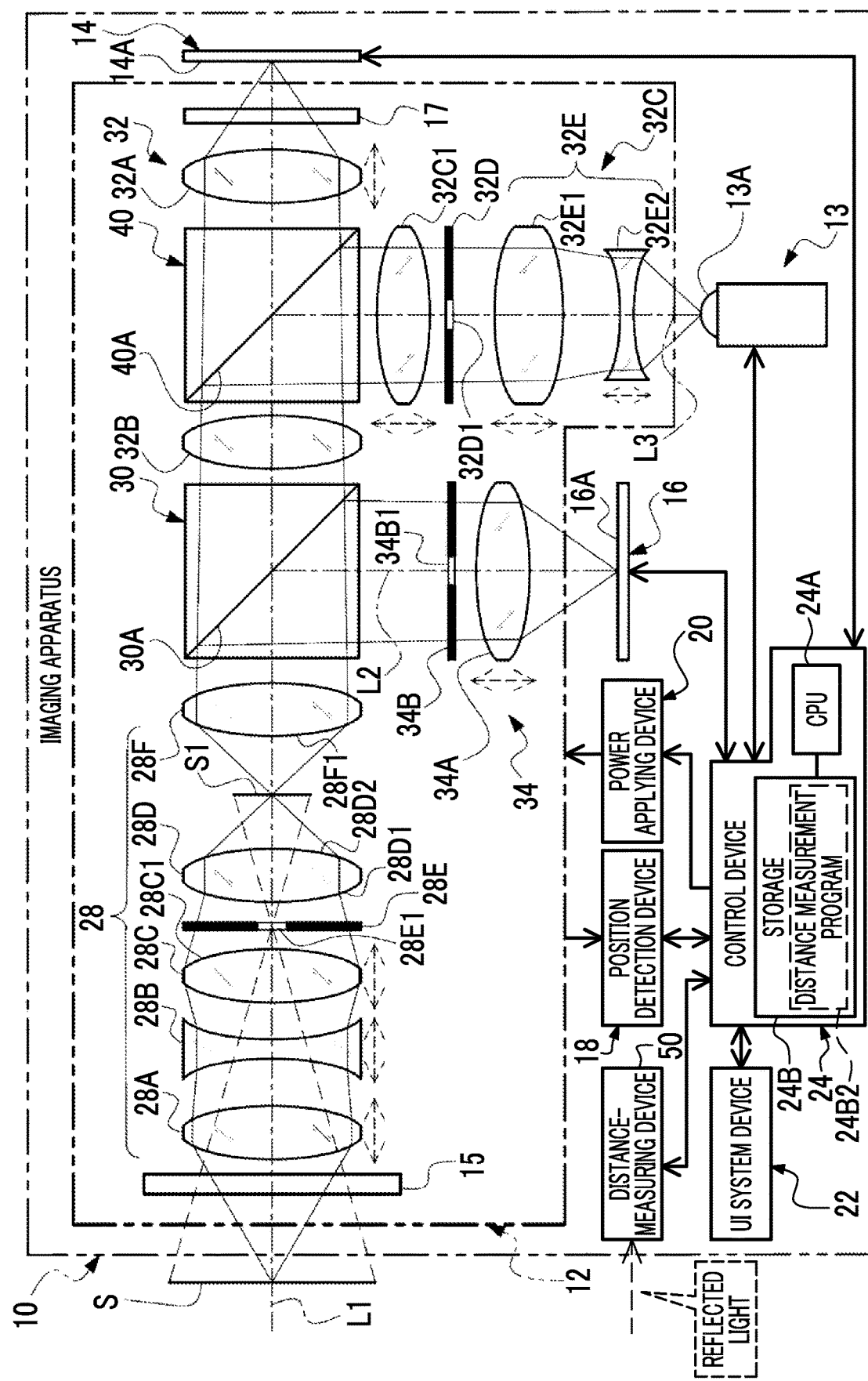
FIG. 13 is a schematic configuration diagram showing an example of a configuration of an imaging apparatus according to a third embodiment.

As shown in FIG. 13 as an example, the imaging apparatus 10 includes a distance-measuring device 50. The distance-measuring device 50 is a distance-measuring device that can detect the infrared light emitted from the light source 13. As an example, the distance-measuring device 50 is a laser distance-measuring device. The distance-measuring device 50 is connected to the control device 24 and outputs information on the light-receiving timing of the infrared light to the control device.

The infrared light emitted from the light source 13 is emitted from the first optical system 28 to the subject S side. A part of the reflected light of the infrared light reflected by the subject S is detected by the distance-measuring device 50. In this case, the light-receiving timing signal is output to the control device 24.

The distance measurement program 24B2 is stored in the storage 24B, and the CPU 24A executes distance image generation processing according to a distance measurement program 24B2. By executing the distance image generation processing, the CPU 24A calculates the information on the distance to the subject S based on the light-receiving timing output from the distance-measuring device 50 and the emission timing of the infrared light from the light source 13. Moreover, the CPU 24A generates distance image data indicating a distance image based on the information on the distance, and causes the display to display the distance image indicated by the generated distance image data. It should be noted that the CPU 24A may generate image data obtained by synthesizing the distance image data and the composite image data 64, and may cause the display to display an image based on the generated image data.

As described above, the imaging apparatus 10 includes the distance-measuring device 50, and the distance-measuring device 50 can obtain the information on the distance to the subject S. In addition, in the imaging apparatus 10, the subject S can be imaged for each of the infrared light and the visible light, and the distance to the subject S can also be measured.

Fourth Embodiment

In the first embodiment, the form example has been described in which the light source 13 is the polarized light source, and the infrared light emitted from the light source 13 is polarized. In a fourth embodiment, a form example will be described in which the light source 13 is a non-polarization light source and the imaging apparatus 10 includes a light source polarizing plate 21 that polarizes the infrared light emitted from the light source 13. It should be noted that, in the fourth embodiment, the components different from the components described in the first embodiment will be designated by the same reference numerals, and description thereof will be omitted.

Figure 14:
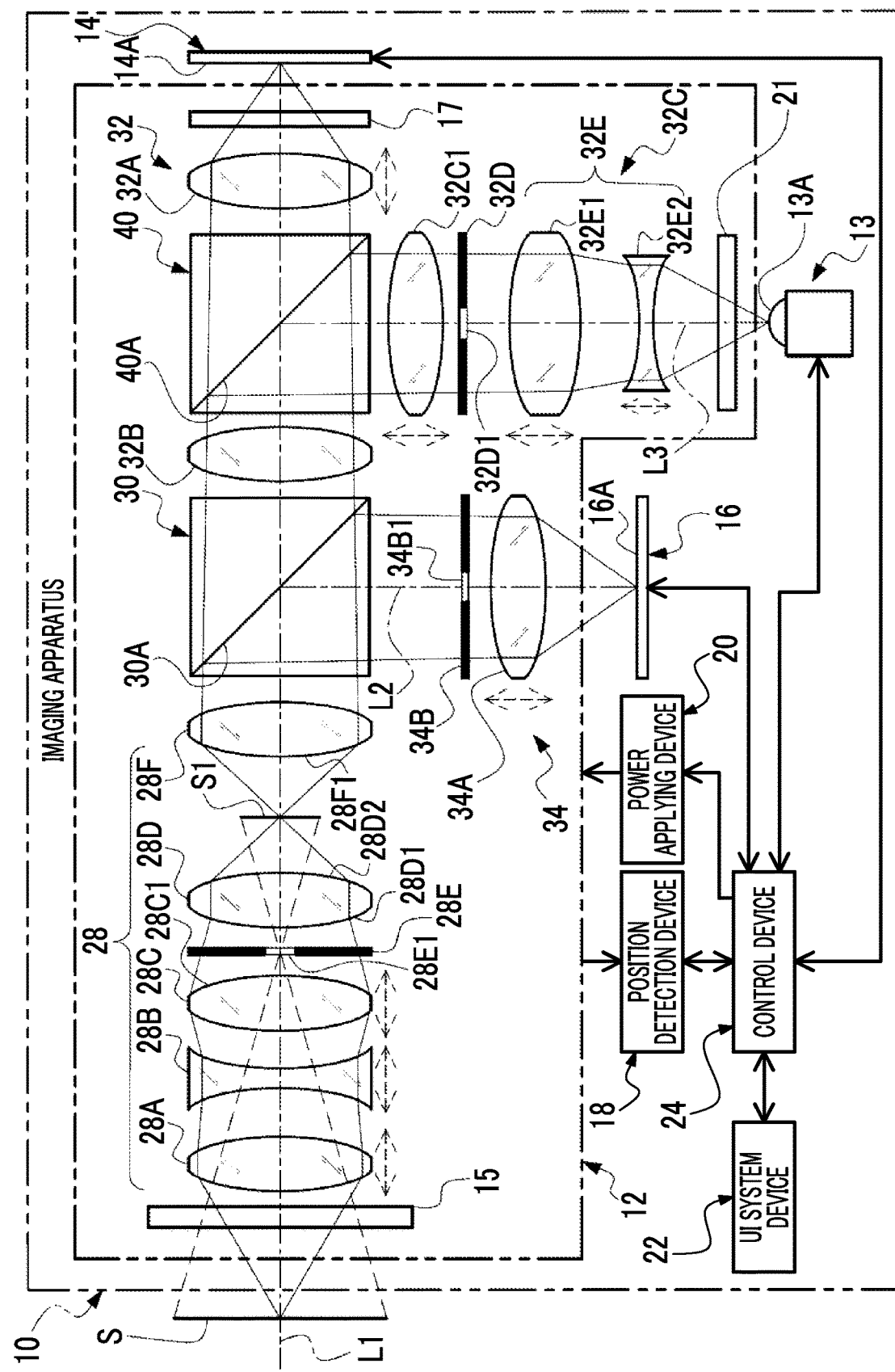
FIG. 14 is a schematic configuration diagram showing an example of a configuration of an imaging apparatus according to a fourth embodiment.

As an example, as shown in FIG. 14, the light source optical system 32C of the second optical system 32 includes the light source polarizing plate 21. The light source polar-izing plate 21 is provided between the seventh lens group 32E2 of the beam expander optical system 32E and the light source 13. The light source polarizing plate 21 polarizes the infrared light emitted from the light source 13, which is the non-polarization light source, in the predetermined polarization direction. It should be noted that light source polarizing plate 21 is an example of a "second polarizing plate" according to the technology of the present disclosure.

The light source 13 is the non-polarization light source that can emit the infrared light that is not polarized in the predetermined direction. Examples of the non-polarization light source include an LED light source. The infrared light emitted from the light source 13 passes through the light source polarizing plate 21, and, in this case, is polarized in a second predetermined polarization direction. Specifically, examples of the second predetermined polarization direction include a polarization direction matching with a first predetermined polarization direction of the polarizing plate 17 after the infrared light is emitted from the phase plate 15 and is incident on the phase plate 15. As a result, the infrared light emitted from the light source 13 and passing through the light source polarizing plate 21 passes through the phase plate 15 twice, in a case of the emission and in a case of the incidence, and then is in the first predetermined polarization direction. That is, the infrared light polarized in the second predetermined polarization direction is polarized in the first predetermined polarization direction by passing through the phase plate 15. Thereafter, the infrared light passes through the polarizing plate 17 and is received by the first image sensor 14. It should be noted that the first predetermined polarization direction is an example of a "first polarization direction" according to the technology of the present disclosure, and the second predetermined polarization direction is an example of a "second polarization direction" according to the technology of the present disclosure.

As described above, the imaging apparatus 10 includes the light source 13 which is the non-polarization light source, and includes the light source polarizing plate 21 that polarizes the infrared light emitted from the non-polarization light source. As compared with a relatively inexpensive polarized light source, such as a laser light source, an inexpensive non-polarization light source, such as the LED light source, can be used, and the manufacturing cost of the imaging apparatus 10 can be reduced.

Fifth Embodiment

In the first embodiment, a form example has been described in which only imaging by the imaging apparatus 10 is performed. In a fifth embodiment, a form example will be described in which imaging in a wider angle range than the imaging apparatus 10 is performed in addition to imaging by the imaging apparatus 10. It should be noted that, in the fifth embodiment, the components different from the components described in the first embodiment will be designated by the same reference numerals, and description thereof will be omitted.

Figure 15:
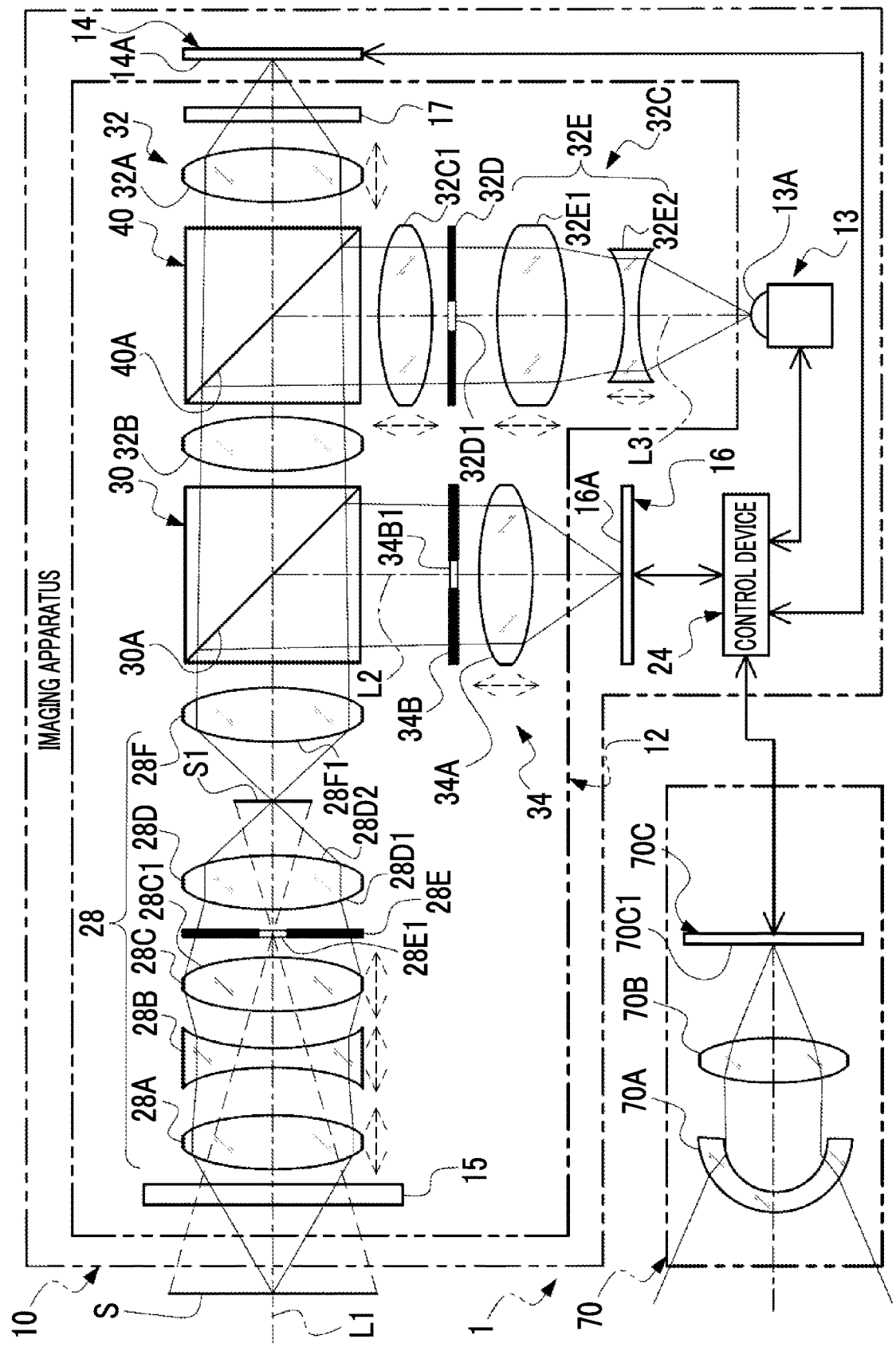
FIG. 15 is a schematic configuration diagram showing an example of a configuration of an imaging apparatus according to a fifth embodiment.

As an example, as shown in FIG. 15, an imaging system 1 includes the imaging apparatus 10 and a wide angle imaging apparatus 70. The wide angle imaging apparatus 70 is an apparatus that can perform imaging in a wider angle range than the imaging apparatus 10. Specifically, the wide angle imaging apparatus 70 includes a wide angle lens 70A, a seventh lens group 70B, and a third image sensor 70C. The wide angle lens 70A is a lens that has an imaging range including the subject S and can realize imaging in a range wider than the imaging range of the imaging apparatus 10.

Examples of the wide angle lens 70A include a fisheye lens. The seventh lens group 70B guides the subject light transmitted through the wide angle lens 70A to the third image sensor 70C and forms an image on the light-receiving surface 70C1 of the third image sensor 70C. The third image sensor 70C receives the subject light. As the third image sensor 70C, an image sensor having sensitivity in the near-infrared wavelength range can be used, and the third image sensor 70C images the infrared light as the subject light.

Figure 16:
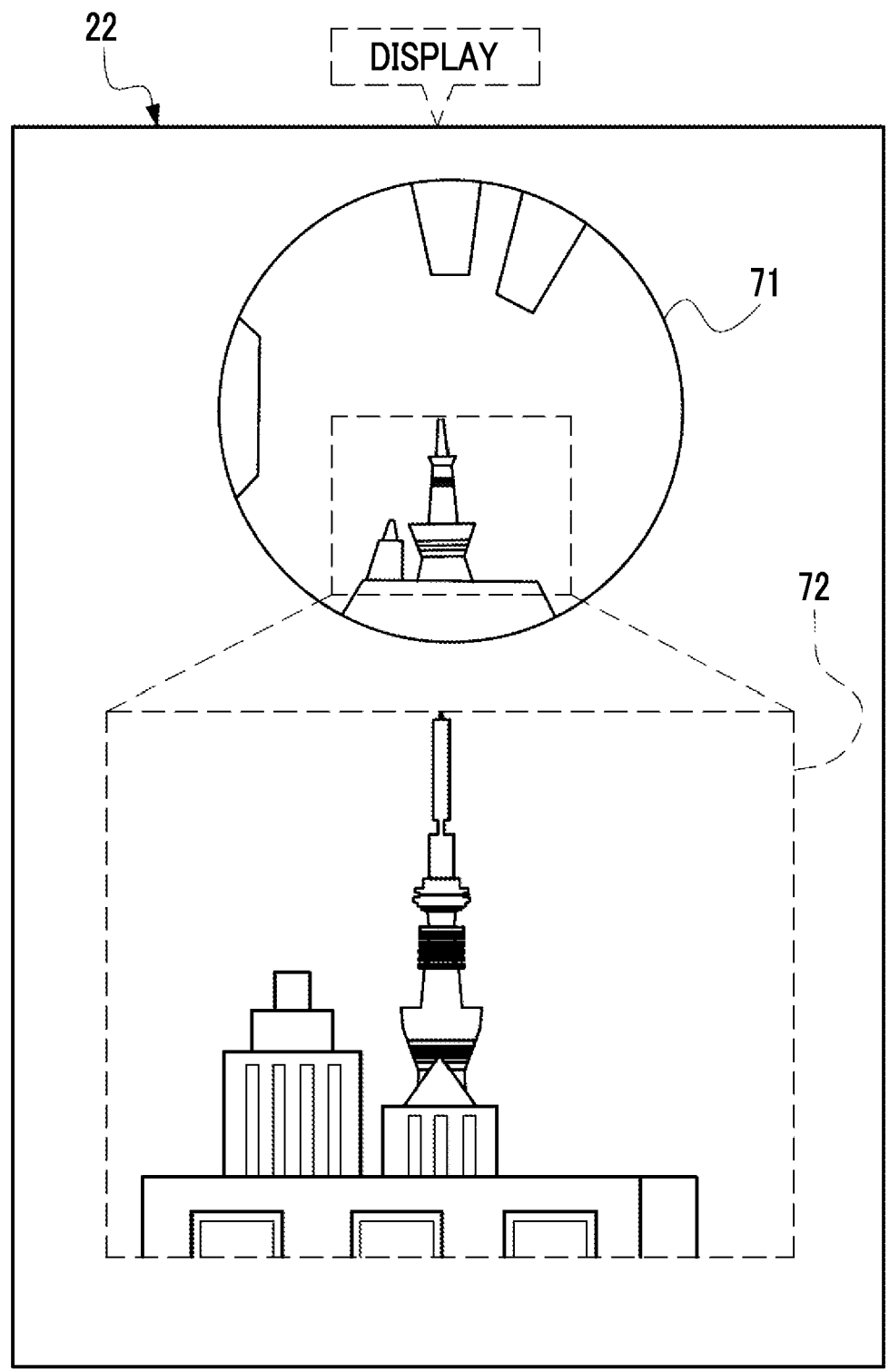
FIG. 16 is a conceptual diagram showing an example of the function of the imaging apparatus according to the fifth embodiment.

The third image sensor 70C is connected to the control device 24 of the imaging apparatus 10 as an example. The control device 24 acquires wide angle image data obtained by being imaged by the third image sensor 70C of the wide angle imaging apparatus 70. In addition, the control device 24 acquires the infrared light image data and the visible light image data obtained by being imaged by the imaging apparatus 10. The control device 24 performs collation processing between the imaging range of the imaging apparatus 10 and the imaging range of the wide angle imaging apparatus 70 based on the imaging results of the wide angle imaging apparatus 70 and the imaging apparatus 10. Specifically, the control device 24 performs image recognition processing, detects a position that matches the imaging result by the imaging apparatus 10 from the imaging result by the wide angle imaging apparatus 70, and determines that such a position is a position corresponding to the imaging range of the imaging apparatus 10. As a result, as an example, as shown in FIG. 16, the control device 24 generates the wide angle image data obtained by being imaged by the wide angle imaging apparatus 70 and narrow angle image data obtained by imaging a narrower imaging range than the imaging range of the wide angle imaging apparatus 70 by the imaging apparatus 10. The narrow angle image data is the infrared light image data. Moreover, the control device 24 causes the display to display a wide angle image 71 indicated by the wide angle image data and a narrow angle image 72 indicated by the narrow angle image data in an associated state. It should be noted that, here, the infrared light image data is described as the narrow angle image data, but this is merely an example, and the visible light image data may be used as the narrow angle image data, or both the infrared light image data and the visible light image data may be used as the narrow angle image data.

As described above, since the imaging system 1 includes the wide angle imaging apparatus 70 and the imaging apparatus 10, it is possible to perform imaging in a wider angle range than imaging by only the imaging apparatus 10. In addition, the imaging system 1 can allow the user to visually recognize the wide angle image 71 obtained by being imaged by the wide angle imaging apparatus 70 and the narrow angle image 72 obtained by being imaged by the imaging apparatus 10 through the display. The imaging range of the imaging apparatus 10 is included in the imaging range of the wide angle imaging apparatus 70. Therefore, the narrow angle image 72 is an image corresponding to a partial image included in the wide angle image 71. The narrow angle image 72 is displayed on the display in association with the wide angle image 71 in a state in which it is possible to specify which portion of the wide angle image 71 corresponds to. As a result, as compared with a case in which it is not indicated that the imaging range of the imaging apparatus 10 is in which range of the wide angle imaging range, it is easy to grasp imaging by the imaging apparatus 10 is performed in which range or direction.

In addition, in each of the embodiments described above, the form example has been described in which the first optical system 28 consists of lenses of four groups, but this is merely an example, and the technology of the present disclosure is not limited to this. For example, the first optical system 28 may consist of lenses of three groups of which the optical power is negative, positive, and positive in order from the subject side, may be lenses of four groups of which the optical power is positive, negative, negative, and positive in order from the subject side, or may be lenses of five groups of which the optical power is positive, negative, positive, positive, and positive in order from the subject side.

In addition, in each of the embodiments described above, the form example has been described in which the control device 24 is realized by the computer including the CPU 24A, the storage 24B, and the memory 24C, but the technology of the present disclosure is not limited to this. For example, the control device 24 may be a device including an ASIC, an FPGA, and/or a PLD. In addition, the control device 24 may be realized by a combination of a hardware configuration and a software configuration.

Figure 17:
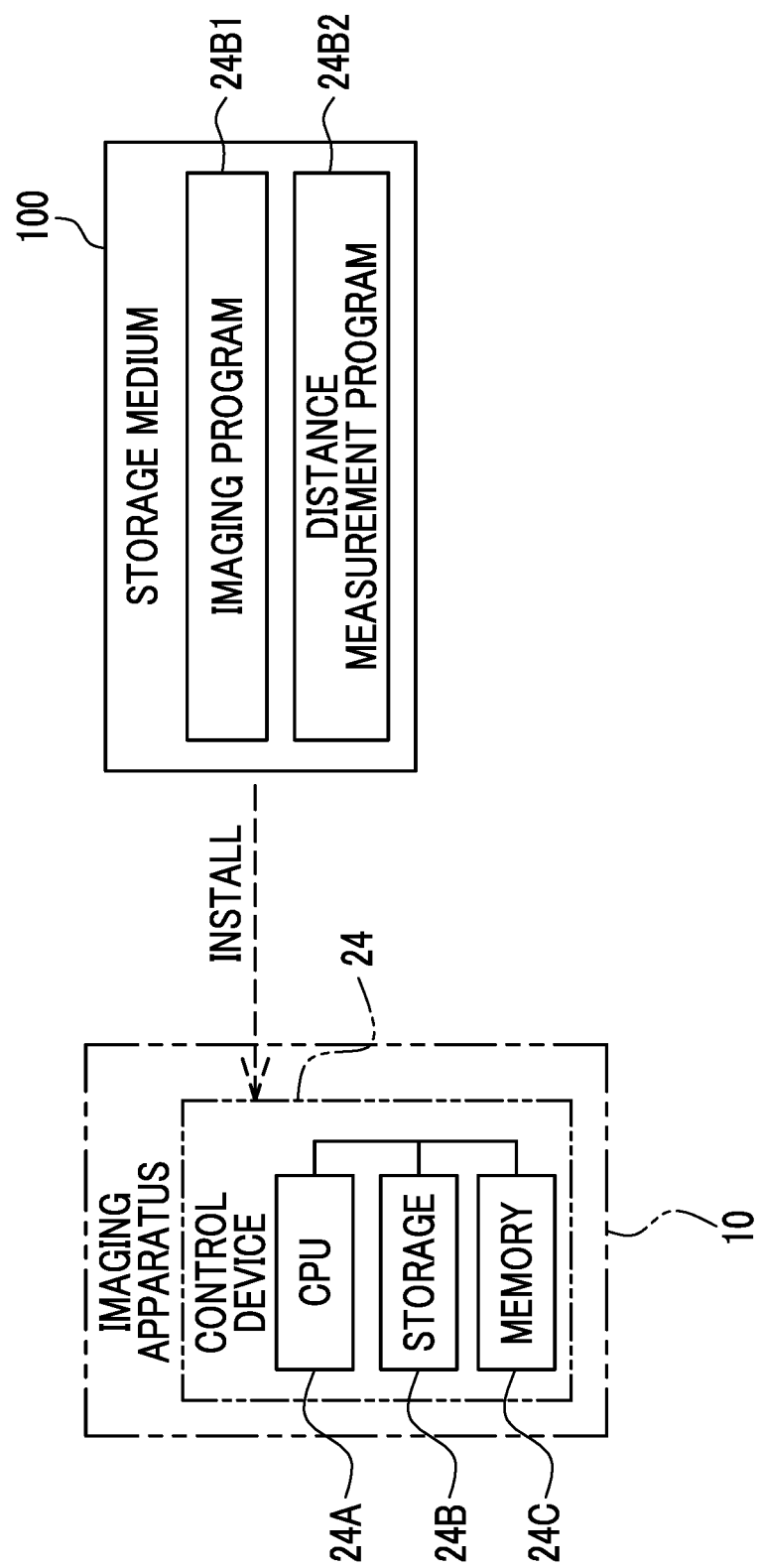
FIG. 17 is a conceptual diagram showing an example of an aspect in which an imaging processing program and a distance measurement program according to the embodiment are installed in a control device in the imaging apparatus from a storage medium that stores the imaging processing program and the distance measurement program.

In addition, in each of the embodiments described above, the imaging program 24B1 and the distance measurement program 24B2 (hereinafter, in a case in which distinction is not needed, referred to as the "program" without designating the reference numeral) are stored in the storage 24B, but the technology of the present disclosure is not limited to this, and the program may be stored in the storage medium 100 as shown in FIG. 17 as an example. The storage medium 100 is a non-transitory storage medium. Examples of the storage medium 100 include any portable storage medium, such as an SSD or a USB memory. The program stored in the storage medium 100 is installed in the control device 24. The CPU 24A executes imaging processing in accordance with the imaging program 24B1, and the CPU 24A executes the distance image generation processing according to the distance measurement program 24B2.

In addition, the program may be stored in a storage unit of other computers or server devices connected to the control device 24 through a communication network (not shown), and the program may be downloaded to the control device 24 in response to a request of the imaging apparatus 10 and installed in the control device 24. In this case, the control device 24 executes the processing based on the program installed in the control device 24.

It should be noted that it is not required to store all the programs in the storage unit or the storage 24B of other computers or server devices connected to the control device 24, and a part of the programs may be stored.

In the example shown in FIG. 17, the aspect example has been described in which the control device 24 is built in the imaging apparatus 10, but the technology of the present disclosure is not limited to this, and for example, the control device 24 may be provided outside the imaging apparatus 10.

In addition, in each of the embodiments described above, the control device 24 has been described, the technology of the present disclosure is not limited to this, and a device including an ASIC, an FPGA, and/or a PLD may be applied as the control device 24 or a combination of a hardware configuration and a software configuration may be used.

In addition, in each of the embodiments described above, the CPU 24A has been described, but the technology of the present disclosure is not limited to this, and a plurality of CPUs may be adopted or a GPU may be adopted.

Various processors shown below can be used as a hardware resource for executing various pieces of processing (here, as an example, the imaging processing and/or the distance image generation processing) in each of the embodiments described above. Examples of the processor include a CPU which is a general-purpose processor functioning as the hardware resource for executing various pieces of processing by executing software, that is, a program. In addition, examples of the processor include a dedicated electric circuit which is a processor having a circuit configuration designed to be dedicated to execute specific processing, such as an FPGA, a PLD, or an ASIC. A memory is built in or connected to any processor, and any processor executes various pieces of processing by using the memory.

The hardware resource for executing various pieces of processing may be configured by one of the various processors or may be configured by a combination of two or more processors that are the same type or different types (for example, combination of a plurality of FPGAs or combination of a CPU and an FPGA). In addition, the hardware resource for executing the various pieces of processing may be one processor.

As an example in which the hardware resource is configured by one processor, first, there is a form in which one processor is configured by a combination of one or more CPUs and software, and the processor functions as the hardware resource for executing various pieces of processing, as represented by a computer, such as a client and a server. Secondly, as represented by SoC, there is a form in which a processor that realizes the functions of the entire system including a plurality of hardware resources for executing various pieces of processing with one IC chip is used. As described above, various pieces of processing are realized by using one or more of various processors as the hardware resource.

Further, as the hardware structure of these various processors, more specifically, it is possible to use an electric circuit in which circuit elements, such as semiconductor elements, are combined.

In addition, various pieces of processing described above are merely examples. Therefore, it is needless to say that the deletion of an unneeded step, the addition of a new step, and the change of a processing order may be employed within a range not departing from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unneeded parts may be deleted, new elements may be added, or replacements may be made with respect to the description contents and the shown contents above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B.

In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be incorporated by reference.

What is claimed is:

1. An imaging apparatus comprising:
   a first optical system that transmits light including first wavelength range light and second wavelength range light;
   a first separation optical system that separates the light transmitted through the first optical system into the first wavelength range light and the second wavelength range light;
   a second optical system that transmits the first wavelength range light obtained by separating the light by the first separation optical system;
   a third optical system that transmits the second wavelength range light obtained by separating the light by the first separation optical system;
   a first image sensor that receives the first wavelength range light emitted from the second optical system;
   a second image sensor that receives the second wavelength range light emitted from the third optical system; and
   a first light source that emits the first wavelength range light,
   wherein the first optical system emits the first wavelength range light emitted from the first light source to a subject, and transmits subject light including first wavelength range reflected light obtained by reflecting the first wavelength range light by the subject,
   the second optical system further includes a second separation optical system, and
   the second separation optical system reflects the first wavelength range light emitted from the first light source, and guides the first wavelength range light to the first separation optical system by allowing the first wavelength range light to pass through a part of an optical path on which the first wavelength range reflected light goes toward the first image sensor.

2. The imaging apparatus according to claim 1,
   wherein the first optical system includes a fixed optical system that includes an optical element, which is immovable in an optical axis direction of the first optical system, and guides the subject light to the first separation optical system, and
   the first optical system emits the first wavelength range light emitted from the first light source to the subject by allowing the first wavelength range light to pass through at least a part of an optical path on which the first wavelength range reflected light goes toward the first image sensor through the fixed optical system.

3. The imaging apparatus according to claim 2,
   wherein the first optical system further includes a zooming optical system that is provided on a subject side with respect to the fixed optical system, and includes an optical element which is movable along the optical axis direction, and
   the first optical system emits the first wavelength range light emitted from the first light source to the subject by allowing the first wavelength range light to pass through at least a part of an optical path on which the first wavelength range reflected light goes toward the first image sensor through the zooming optical system and the fixed optical system.

4. The imaging apparatus according to claim 1,
wherein the first separation optical system and the first optical system emit the first wavelength range light emitted from the first light source to the subject by allowing the first wavelength range light to pass through at least a part of an optical path on which the first wavelength range reflected light goes toward the first image sensor through the first optical system and the first separation optical system.

5. The imaging apparatus according to claim 1,
wherein the first separation optical system transmits the first wavelength range light along a first direction along an optical axis direction of the first optical system, and reflects the second wavelength range light in a second direction intersecting the first direction.

6. The imaging apparatus according to claim 1,
wherein the first optical system includes a phase plate that polarizes the first wavelength range light,
the second optical system includes a first polarizing plate that allows light in a first polarization direction to pass,
the phase plate emits the first wavelength range light emitted from the first light source to the subject by transmitting the first wavelength range light, and polarizes the first wavelength range reflected light in the first polarization direction by allowing the first wavelength range reflected light to be incident, and
the first polarizing plate guides the first wavelength range reflected light polarized in the first polarization direction by the phase plate to the first image sensor by allowing the first wavelength range reflected light to pass.

7. The imaging apparatus according to claim 6,
wherein the first polarization direction is a direction intersecting a polarization direction of the first wavelength range light emitted from the first light source.

8. The imaging apparatus according to claim 6,
wherein the phase plate is a ¼ phase plate, and
the phase plate emits the first wavelength range light emitted from the first light source to the subject by transmitting the first wavelength range light, and changes a polarization direction of the first wavelength range light by 90 degrees with respect to a polarization direction of the first wavelength range light before the first wavelength range light is transmitted, by allowing the first wavelength range reflected light to be incident.

9. The imaging apparatus according to claim 6,
wherein the first light source is a non-polarization light source,
the second optical system further includes a second polarizing plate,
the second polarizing plate polarizes the first wavelength range light emitted from the first light source in a second polarization direction, and
the first wavelength range light polarized in the second polarization direction passes through the phase plate to be the light in the first polarization direction.

10. The imaging apparatus according to claim 1, further comprising:
a distance-measuring device that detects the first wavelength range reflected light to measure a distance to the subject based on a detection result.

11. The imaging apparatus according to claim 1, further comprising:
a first processor,
wherein the first processor measures a distance to the subject based on an emission timing at which the first wavelength range light is emitted from the first light source, and a light-receiving timing at which the first wavelength range reflected light is received by the first image sensor.

12. The imaging apparatus according to claim 1, further comprising:
a second processor,
wherein the second processor generates image data for the subject light based on an emission timing at which the first wavelength range light is emitted from the first light source, and a light-receiving timing at which the first wavelength range reflected light is received by the first image sensor.

13. The imaging apparatus according to claim 1,
wherein the second wavelength range light is visible light, and
the first wavelength range light is long-wavelength light having a longer wavelength than the visible light.

14. The imaging apparatus according to claim 13,
wherein the long-wavelength light is light in an infrared light wavelength range having a wavelength range of 1400 nm or more and 2600 nm or less.

15. The imaging apparatus according to claim 14,
wherein the infrared light wavelength range is a near-infrared light wavelength range including 1550 nm.

16. The imaging apparatus according to claim 13,
wherein the long-wavelength light is light in a near-infrared light wavelength range having a wavelength range of 750 nm or more and 1000 nm or less.

17. The imaging apparatus according to claim 1, further comprising:
a first stop that is provided between the first light source and the first optical system, and limits a light amount of the first wavelength range light emitted from the first light source.

18. The imaging apparatus according to claim 1,
wherein the first optical system includes a plurality of lenses, and
an anti-reflection film that makes reflectivity to the first wavelength range light and the second wavelength range light lower than reflectivity to light in other wavelength ranges is formed on a light-receiving surface of at least one lens of the plurality of lenses.

19. The imaging apparatus according to claim 1,
wherein the first optical system includes a second stop having an aperture and an outer peripheral region that forms the aperture,
the aperture transmits the first wavelength range light and the second wavelength range light, and
the outer peripheral region transmits the first wavelength range light and limits transmission of the second wavelength range light.

20. The imaging apparatus according to claim 1,
wherein the second optical system includes a focus adjustment optical system including a lens capable of adjusting a focus of the first wavelength range reflected light.

21. The imaging apparatus according to claim 1, further comprising:
a light distribution adjustment optical system that is provided between the first light source and an optical path through which the first wavelength range reflected light passes, and includes a lens capable of adjusting light distribution of the first wavelength range light emitted from the first light source.

22. The imaging apparatus according to claim 1, further comprising:
- a beam expander optical system that is provided between the first light source and an optical path through which the first wavelength range reflected light passes, and is capable of adjusting a beam diameter of the first wavelength range light emitted from the first light source.

23. The imaging apparatus according to claim 1,
wherein the first light source has a Brewster window, and
the first light source emits the first wavelength range light through the Brewster window.

24. The imaging apparatus according to claim 1,
wherein the first light source is a light source capable of changing an emission direction of the first wavelength range light.

* * * * *